United States Patent

Bucklin, Jr. et al.

[15] 3,656,130

[45] Apr. 11, 1972

[54] DISC RANDOM ACCESS MEMORY SYSTEM

[72] Inventors: Edward P. Bucklin, Jr., Hawthorne; Pat E. Evans, Torrance; Richard K. Gerlach, Rolling Hills Estates, all of Calif.

[73] Assignee: The National Cash Register Company, Dayton, Ohio

[22] Filed: June 4, 1970

[21] Appl. No.: 41,766

Related U.S. Application Data

[63] Continuation of Ser. No. 648,496, June 23, 1967, abandoned.

[52] U.S. Cl. ....................................................340/174.1 C

[51] Int. Cl. ......................................................G11b 21/08

[58] Field of Search...............340/174.1 C, 174.1 B, 174.1 F; 179/100.2 CA, 100.2 MD

[56] References Cited

UNITED STATES PATENTS 3,156,906 11/1964 Cummins ........................340/174.1 C

*Primary Examiner*—Bernard Konick
*Assistant Examiner*—Robert S. Tupper
*Attorney*—Louis A. Kline and Joseph R. Dwyer

[57] ABSTRACT

A control system is provided for random access to data storage areas comprising sectors of data tracks on the surfaces of rotating record discs of a group of disc storage units. Each disc storage unit of this group comprises a pair of disc files including two interchangeable record disc stacks and a movable head assembly for each disc stack. In response to control information including an address supplied to the control system, the movable head assembly for the addressed storage unit and file is moved radially until the address, specifying the data track, compares identically to the pre-recorded (label) track address read from the disc surface by a predetermined one of the read/write heads (label head) in the head assembly. The track addresses comprise a portion only of each of a group of label tracks which are read by said predetermined label head during radial movement of the head assembly and each of the label tracks includes sector addresses and control signals including clock pulses for writing data, synchronization signals for timing of operations including switching operations for selectively gating the signals read by the label head and data signals read by a selected one of the remaining read/write (data) heads of the head assembly to a single read amplifier of the control system.

13 Claims, 17 Drawing Figures

INVENTORS
EDWARD P. BUCKLIN, JR.
PAT E. EVANS
RICHARD K. GERLACH

BY
THEIR ATTORNEYS

INVENTORS
EDWARD P. BUCKLIN, JR.
PAT E. EVANS
RICHARD K. GERLACH

Louis A Kline
BY John T. Matlago
THEIR ATTORNEYS

INVENTORS
EDWARD P. BUCKLIN, JR.
PAT E. EVANS
RICHARD K. GERLACH

BY

THEIR ATTORNEYS

INVENTORS
EDWARD P. BUCKLIN, JR.
PAT E. EVANS
RICHARD K. GERLACH

BY Louis A. Kline
John T. Matlago
Richard ... 
THEIR ATTORNEYS

PATENTED APR 11 1972

3,656,130

SHEET 05 OF 11

INVENTORS
EDWARD P. BUCKLIN, JR.
PAT E. EVANS
RICHARD K. GERLACH

BY Louis A Kline
John J. Matlago
Richard T. [illegible]

THEIR ATTORNEYS

INVENTORS
EDWARD P. BUCKLIN, JR.
PAT E. EVANS
RICHARD K. GERLACH

BY Louis A. Kline
John T. Mathago
Richard D. Henquel

THEIR ATTORNEYS

Disc Unit #0

INVENTORS
EDWARD P. BUCKLIN, JR.
PAT E. EVANS
RICHARD K. GERLACH

BY [signatures]
THEIR ATTORNEYS

INVENTORS
EDWARD P. BUCKLIN, JR.
PAT E. EVANS
RICHARD K. GERLACH

BY Louis A. Kline
John T. Matlago
Richard J. [illegible]
THEIR ATTORNEYS

INVENTORS
EDWARD P. BUCKLIN, JR.
PAT E. EVANS
RICHARD K. GERLACH

BY Louis A. Kline
John T. Matlago
Richard D. Lanyul
THEIR ATTORNEYS

INVENTORS
EDWARD P. BUCKLIN, JR.
PAT E. EVANS
RICHARD K. GERLACH

BY

THEIR ATTORNEYS

SECTOR TIME DIAGRAM

INVENTORS
EDWARD P. BUCKLIN, JR.
PAT E. EVANS
RICHARD K. GERLACH

BY
THEIR ATTORNEYS

DISC RANDOM ACCESS MEMORY SYSTEM

This application is a continuation of U. S. application Ser. No. 648,496, field June 23, 1967 and now abandoned.

SUMMARY OF THE INVENTION

The system of the present invention provides random access mass data storage for data processors. More particularly, the present system provides for access to the large amount of data storage areas of record discs at higher speeds to substantially improve the "thru-put" capabilities of data processing systems. These higher speed capabilities are provided, in part, by increasing the amount of data which is directly under the record heads of a multiple head assembly, including a multiple head unit for each record disc surface which retains the capability of movement of the head assembly for higher density storage, i.e., high track density while providing the overall higher data storage capacity and flexibility of removable media systems, i.e., readily removable and replaceable disc stacks.

Direct and immediate access to many data tracks under the record heads without requiring movement of the multiple head assembly, provides the high-speed advantages of head-per-track systems without the disadvantages of the added cost of head-per-track systems. Thus, the present system retains the high-speed advantages of head-per-track systems by providing direct access, without movement, to a very large number of data tracks located directly under the multiple record heads for each record disc surface while retaining the capability of rapid repositioning movements required to position the head assembly for access to multiple data tracks for each record head. Further, in order to provide access to a large number of record tracks for each head, e.g., 16 record tracks, the positioning movements are grouped into groups and sub-groups to provide faster access to tracks in the subgroups including four tracks for each record head. These movements are controlled by reading different track addresses in each of 16 label tracks which specify which group and subgroup of record tracks are directly under the record heads of the multiple head assembly. This arrangement provides the advantages of a limited number of record tracks per record head without restricting the storage capacity of the present system or the additional cost of a larger number of record heads or head assemblies. Further, the added advantage of overall unlimited storage capacity is provided by retracting and accurately returning the multiple head assembly for cooperation with the record discs of any one of the interchangeable disc stacks.

In the control system for the disc units, provision is made for addressing each unit by the processor to produce concurrent positioning movements, when required, to access data tracks in these units. As a result, all disc units are capable of being controlled for simultaneously locating addressed data storage areas on the discs of the respective units and the first unit to locate the addressed areas becomes operative for reading or writing data in the addressed storage area, or as is more common in operation, one of the disc units is operative while the other units are locating addressed storage areas on the respective disc units in order that their head assemblies are properly positioned for operation as soon as the one unit which is operative has completed reading or writing.

The features and advantages of the invention will become apparent to those skilled in the art as the disclosure is made in the following detailed description of a preferred embodiment of the invention as illustrated in the accompanying sheets of drawing in which:

FIG. 1 is a general block diagram of a basic data processing system for illustrating a typical operating environment of the disc random access memory system of the present invention;

FIG. 1*a* is a pictorial view of a typical Disc Unit including two Disc Files of the system of the present invention;

FIG. 2 is a pictorial view showing certain mechanical details of a Disc File of the typical Disc Unit shown in FIG. 1*a*;

FIG. 2*a* is a detailed view of a portion of the Zone Positioner of the head assembly shown in FIG. 2 to illustrate certain details of operation for selectively positioning the head assembly over addressed record tracks;

FIG. 2*b* is a greatly enlarged diagrammatic view of exemplary adjacent label tracks on the surface of a record disc for illustrating reading of addresses recorded on label tracks during radial movement of the head assembly;

Figure 1:
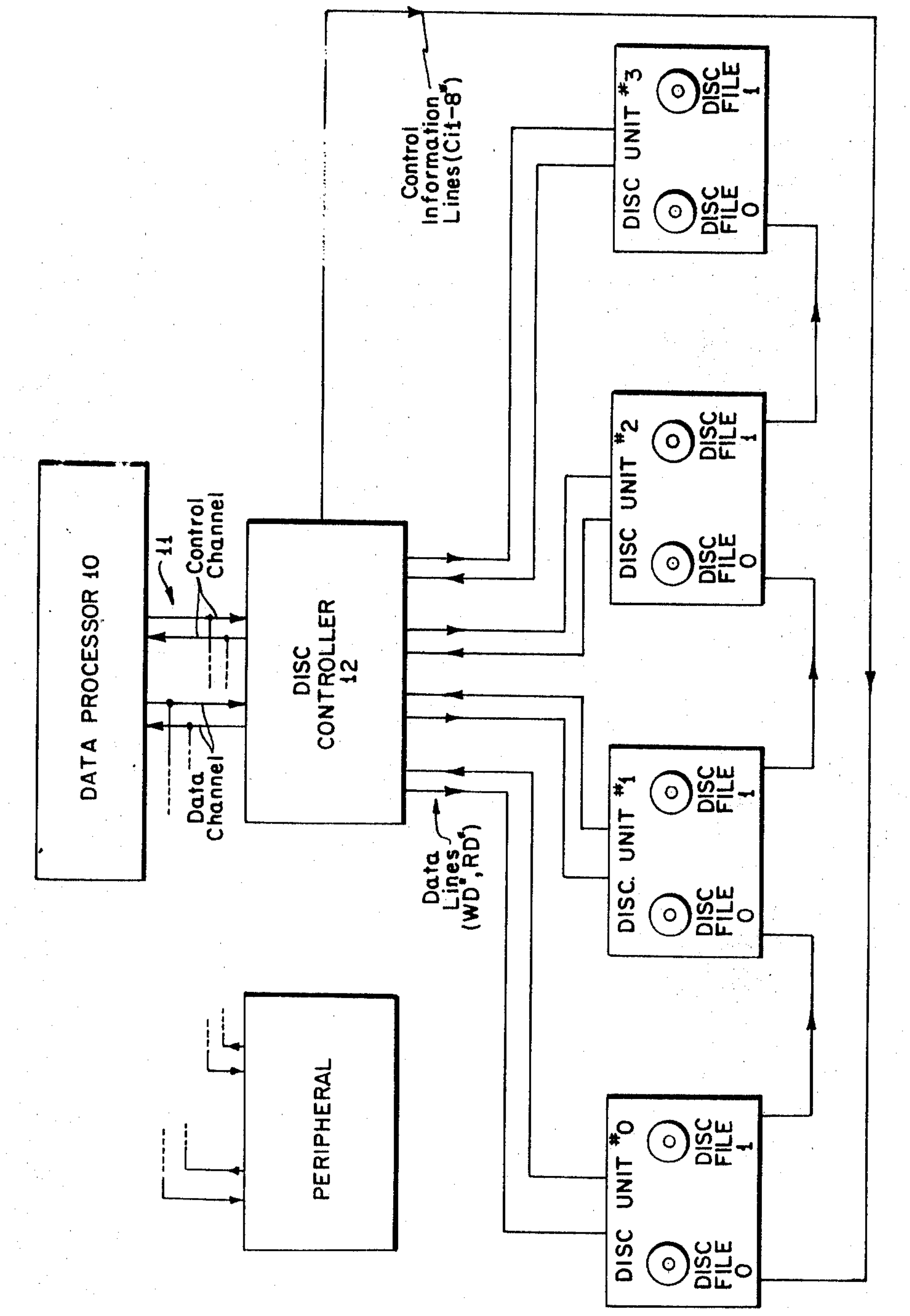
Figure 12:
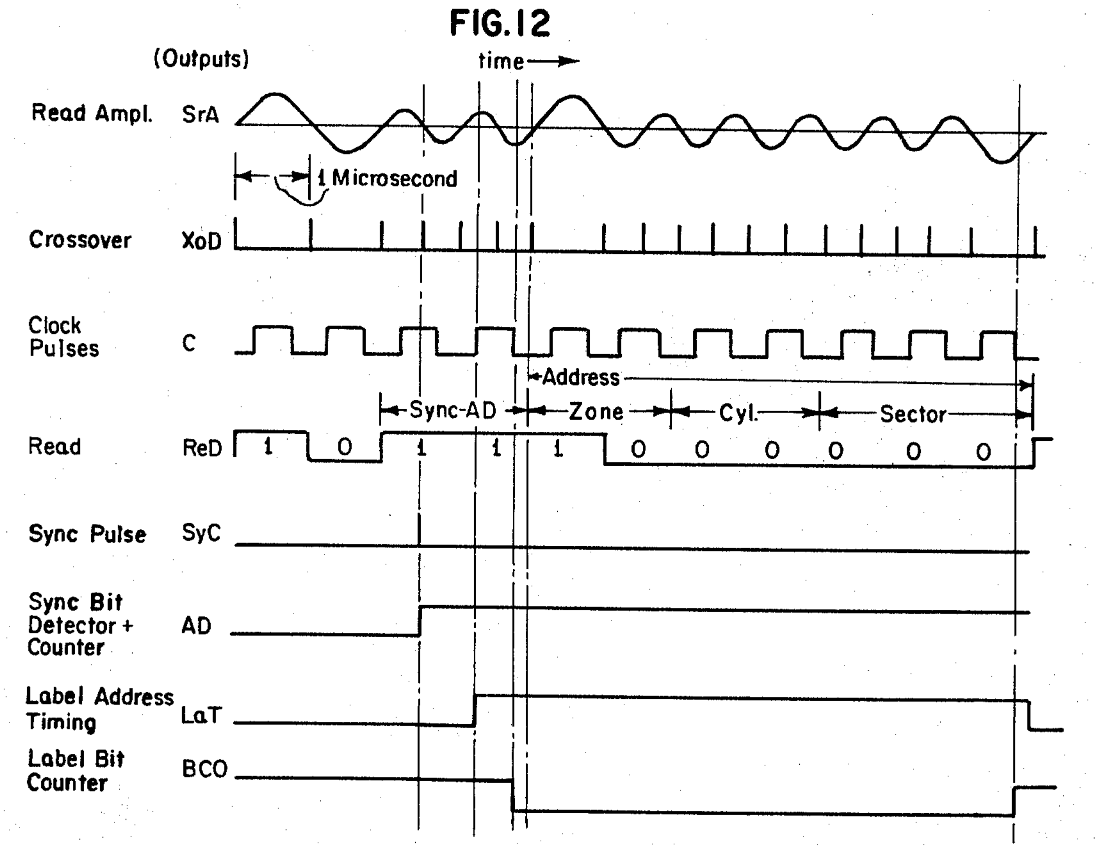
Figure 1A:
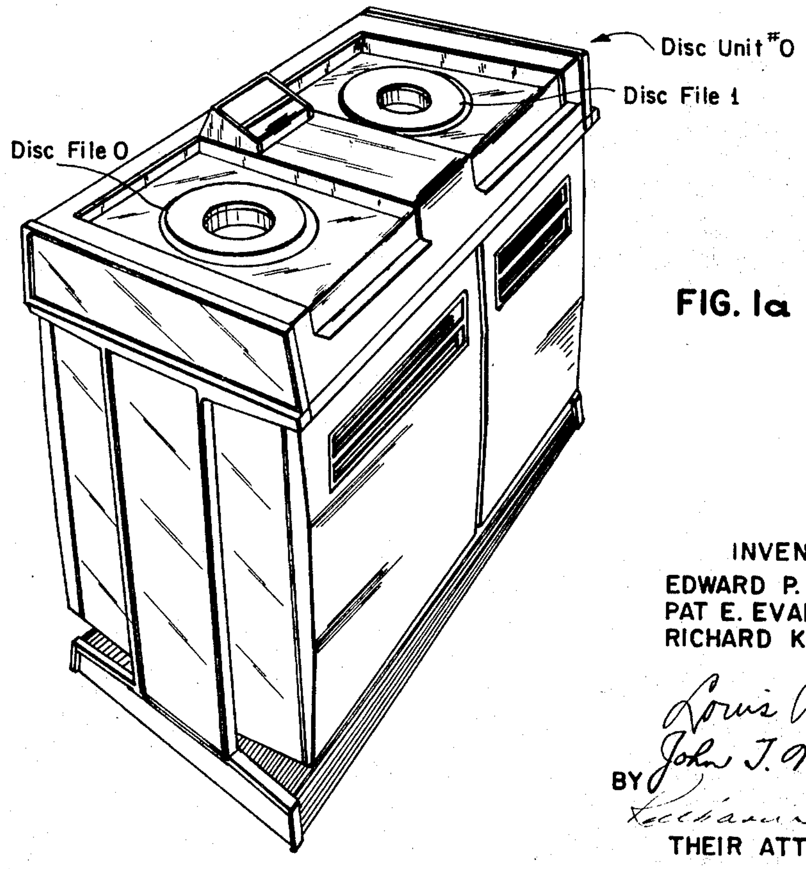
Figure 2:
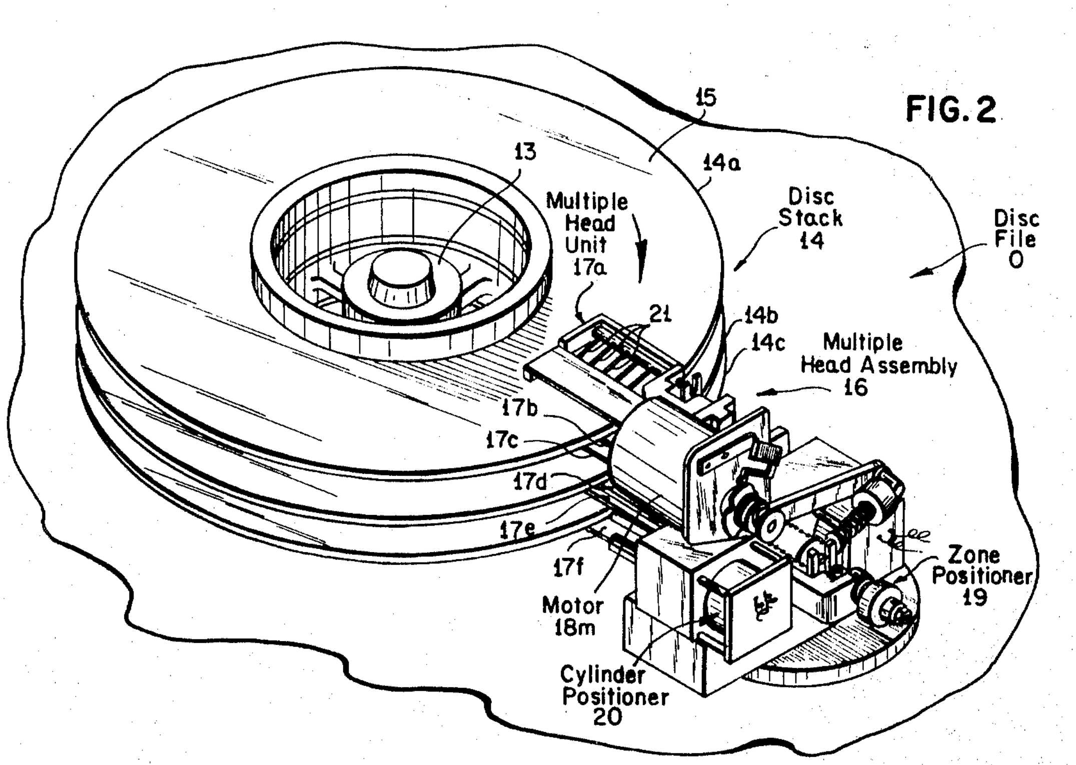
Figures 2A, 2B, 7:
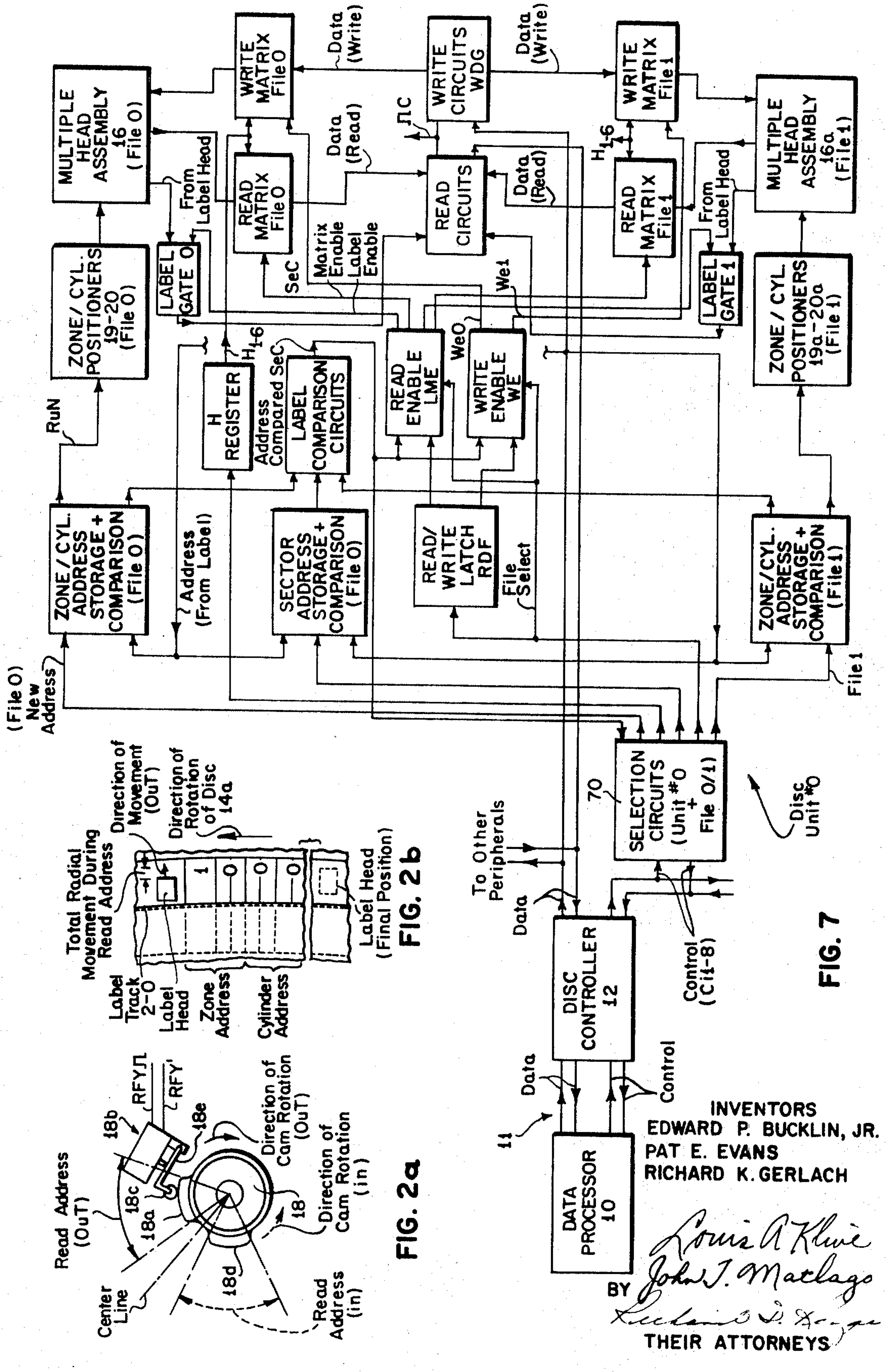
FIG. 7 is a schematic block diagram showing the general system arrangement including a typical Disc Unit.
Figure 9:
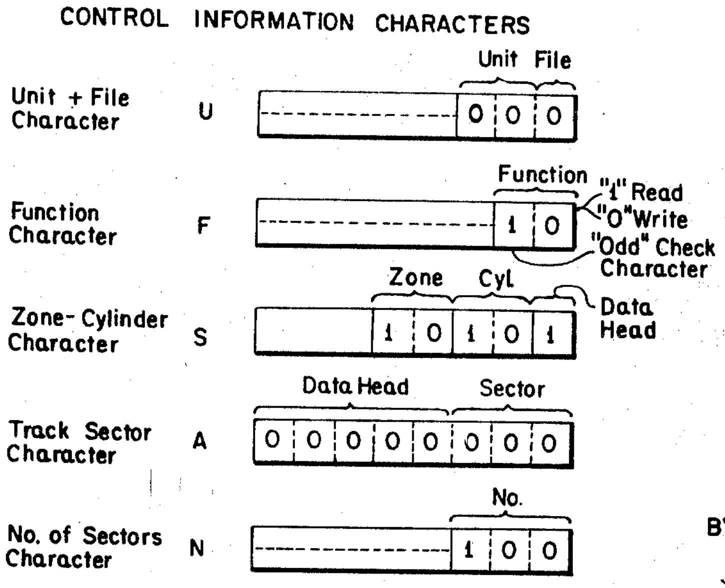
Figure 7A:
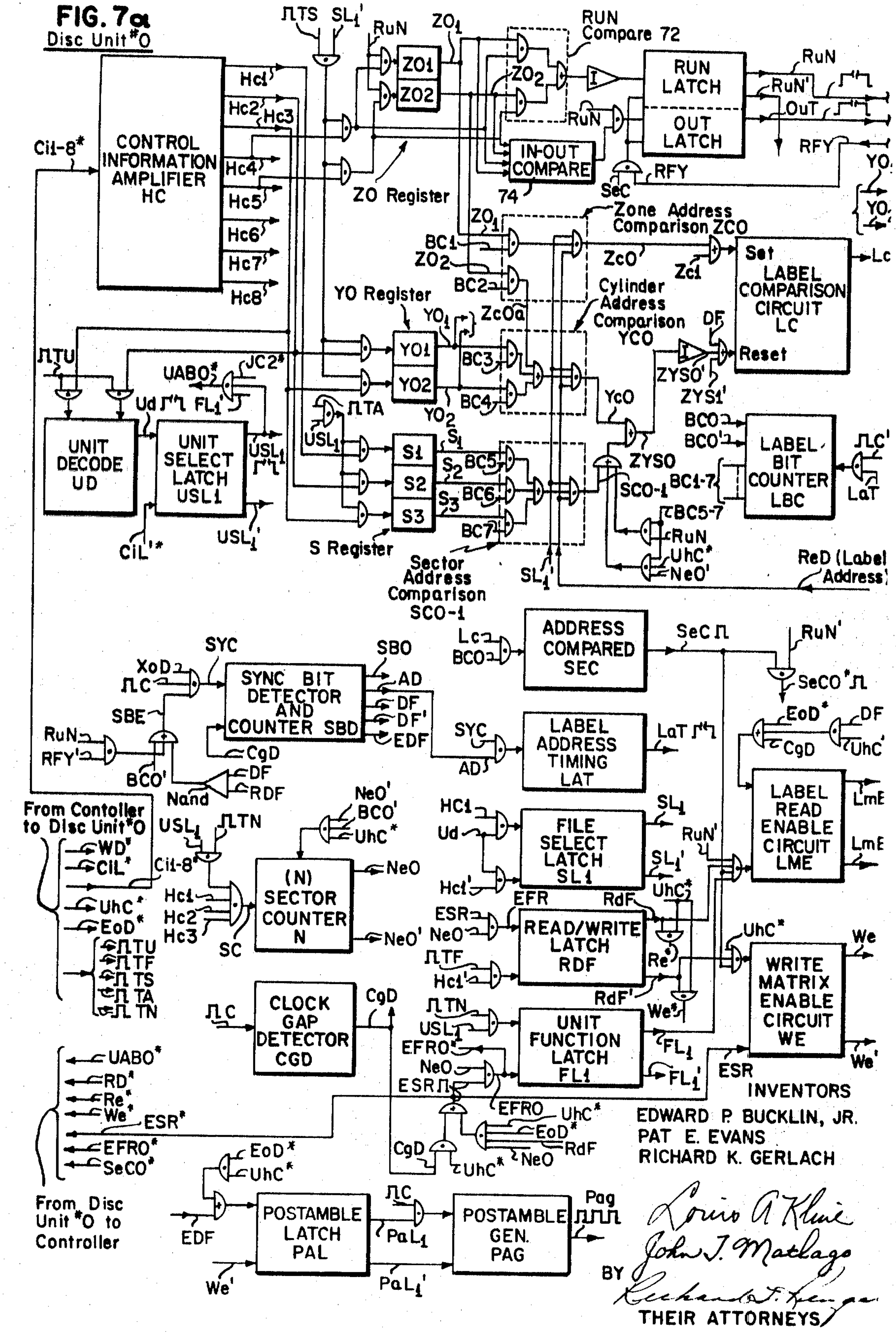
Figure 7B:
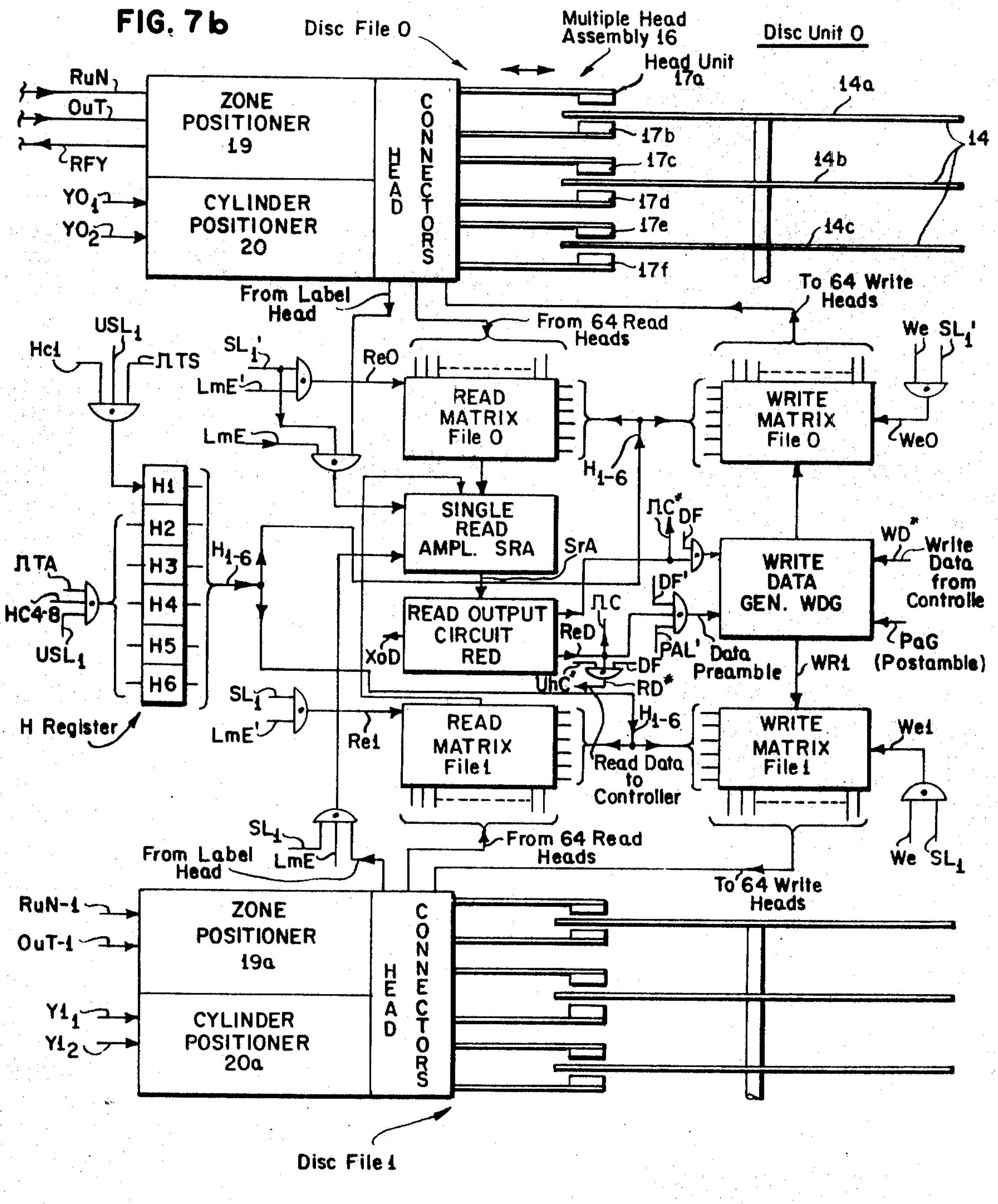
Figure 8:
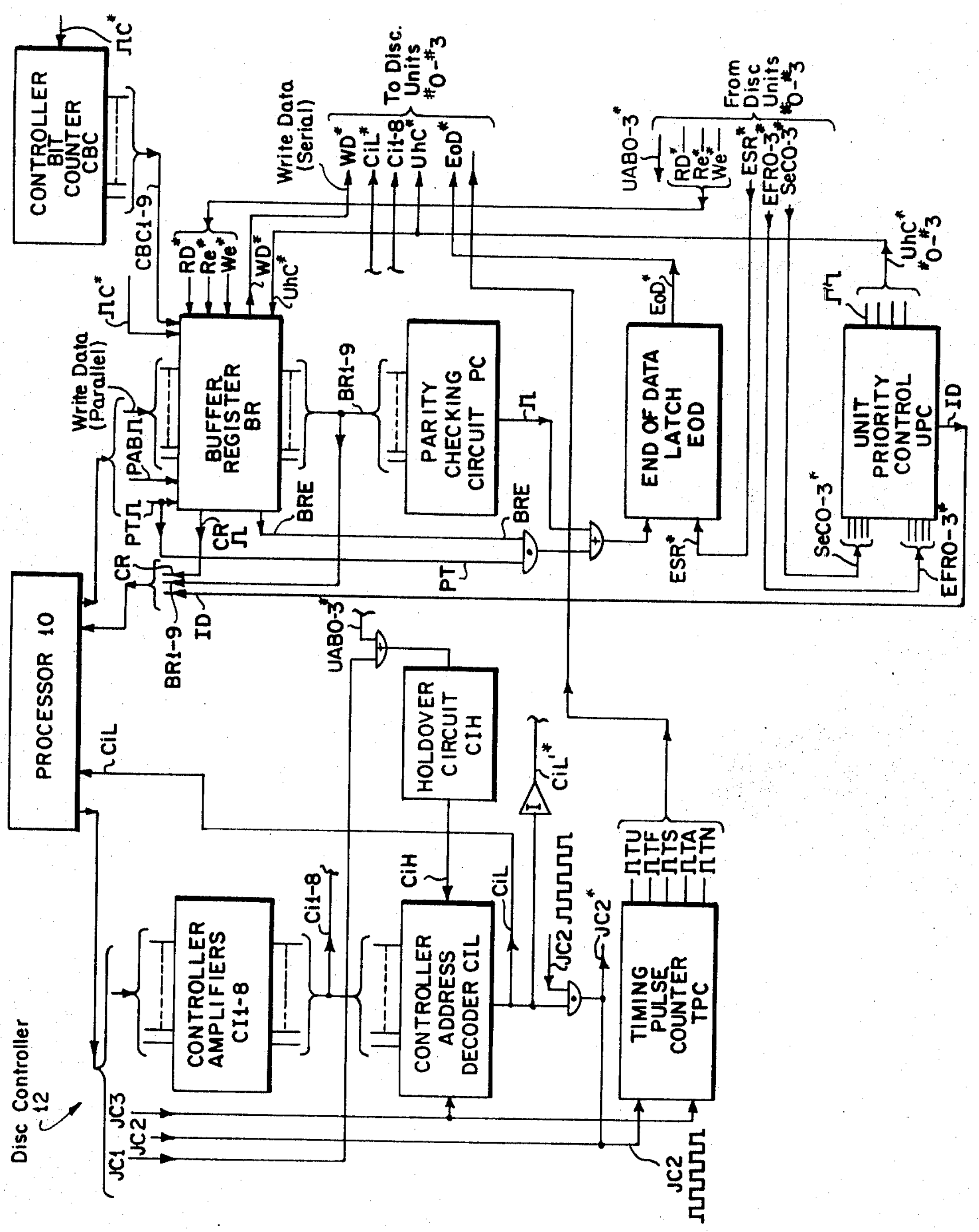
Figure 10:
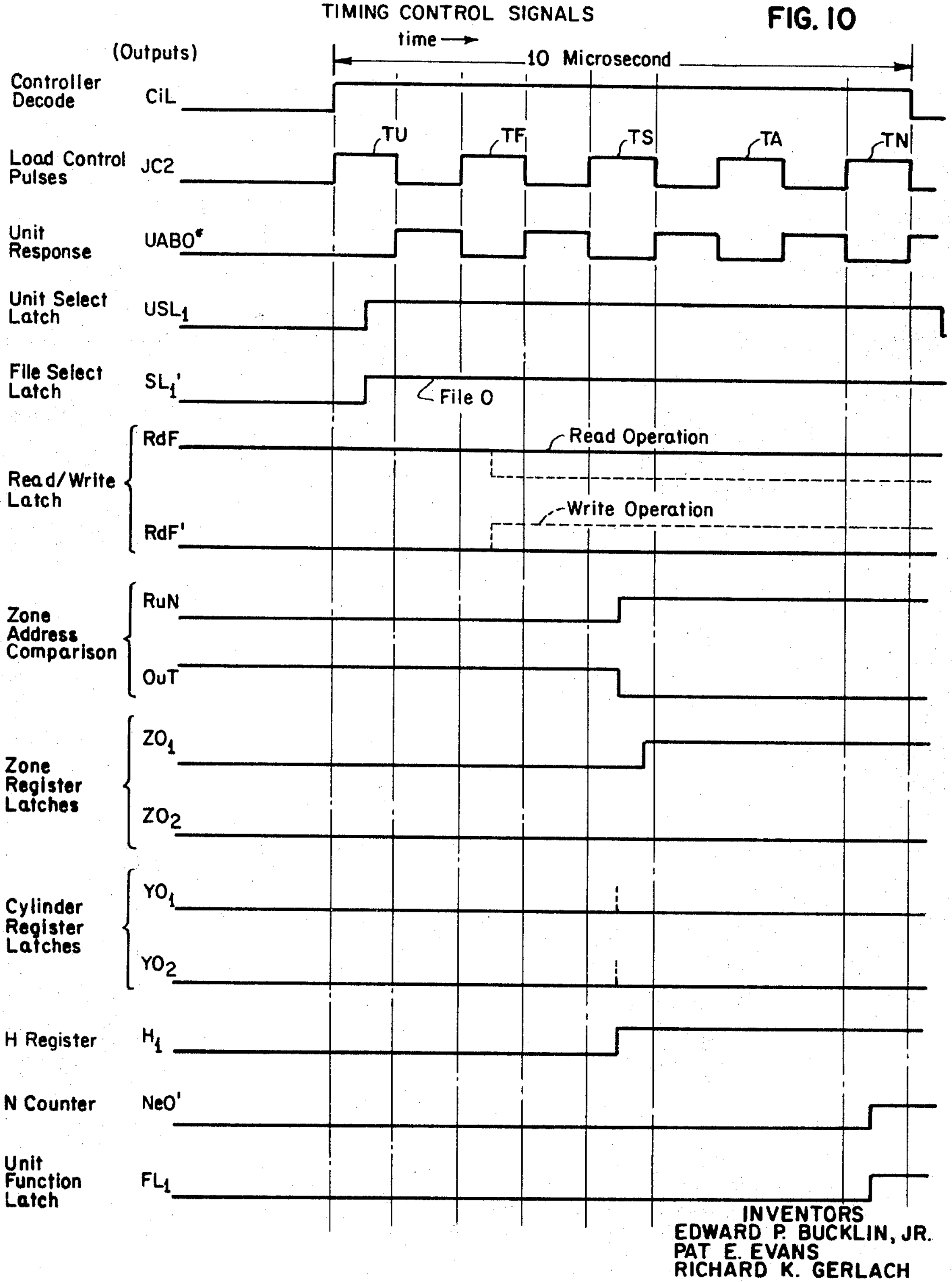
Figure 11:
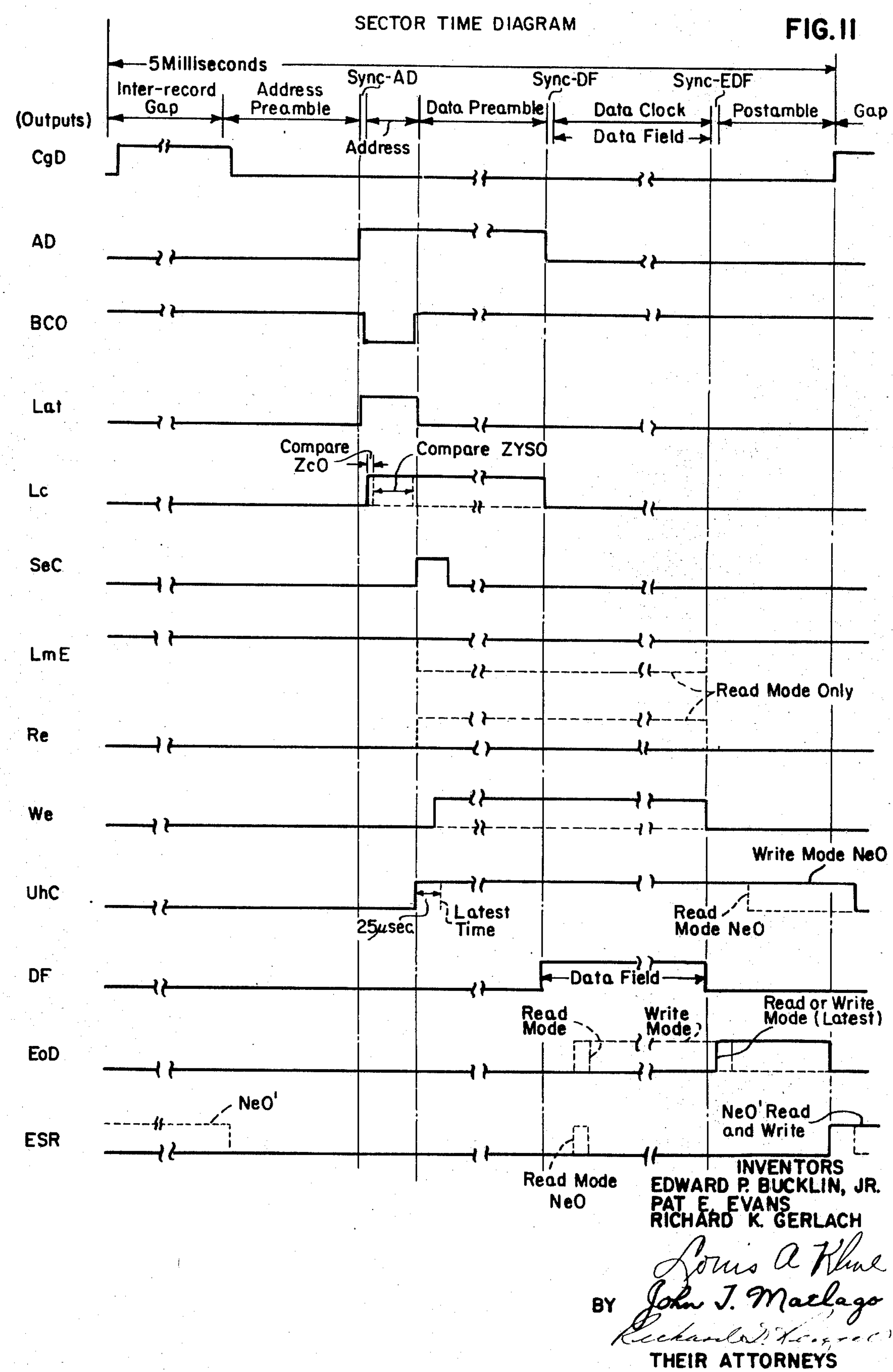

FIG. 7*a* and 7*b*, taken together, comprise a more detailed schematic block diagram of the typical Disc Unit shown more generally in FIG. 7;

FIG. 8 is a schematic block diagram of the Disc Controller, shown by a single block in FIGS. 1 and 7 and including a single Processor block for illustrating the operation thereof in providing control for the Disc Units;

FIG. 9 is a diagrammatic showing of exemplary control information characters provided for selection and control of the Disc File shown pictorially in FIG. 2 and schematically in FIGS. 7, 7*a* and 7*b* for accessing data sector storage areas of the data tracks; and FIGS. 10 to 12 are timing diagrams including illustrative signal waveforms produced during the operation of the present invention for demonstrating exemplary data accessing operations of the disc random access memory system of the present invention.

GENERAL DESCRIPTION

Referring to FIG. 1, a general block diagram is shown of a typical overall system in accordance with the present invention including a Data Processor 10, a Disc Controller 12, and four Disc Units No. 0 to No. 3. Each Disc Unit comprises two Disc Files. The Data Processor 10 includes a high speed memory, arithmetic and logic unit, program control, timing control, and input-output logic circuits for data transfer operations with selected peripherals, i.e., Disc Units No. 0 to No. 3, in response to a request for transfer of data from or to a selected one of the Disc Units No. 0 to No. 3 by means of the respective Controller 12 therefor.

The Data Processor 10 has normally provision for "on-line" connection and operation of Disc Units No. 0 to No. 3 and various other types of peripheral equipment by means of a "-common trunk" 11 and respective controllers therefor. For purposes of illustration of the control system of the present invention, only the Disc Controller 12 and Disc Unit No 0 are shown and described in detail. Accordingly, the Data Processor 10 as shown in FIG. 1, has provisions for "on-line" communication with Disc Controller 12 which is capable for controlling Disc Units No. 0 to No. 3 and the respective Disc Files thereof. As disclosed, for example, in the commonly assigned, copending U.S. application of Robert O. Gunderson et al., Ser. No. 636,147, Data Processor 10 typically includes a command section in the memory for the storage of commands including IN-OUT commands for "on-line" communication including "answer-back" response with Disc Controller 12. Controller 12, in turn, provides for processor "off-line" accessing of data stored in the Disc Files of peripheral Disc Units No. 0 to No. 3 in accordance with control information supplied "on-line" to the Disc Controller. Accordingly, the Data Processor 10, by means of the IN-OUT commands, initiates selection of a particular peripheral unit, Disc Unit No. 0 for example, including "off-line" control thereof by an I/O (input-output) portion of the arithmetic logic unit (not shown) of the Data Processor 10 and Disc Controller 12. A further description of the control system of the invention will be set forth in detail later in connection with FIGS. 7*a*, 7*b* and 8 after the description of a typical Disc File 0 of Disc Unit No. 0.

Figures 4, 5:
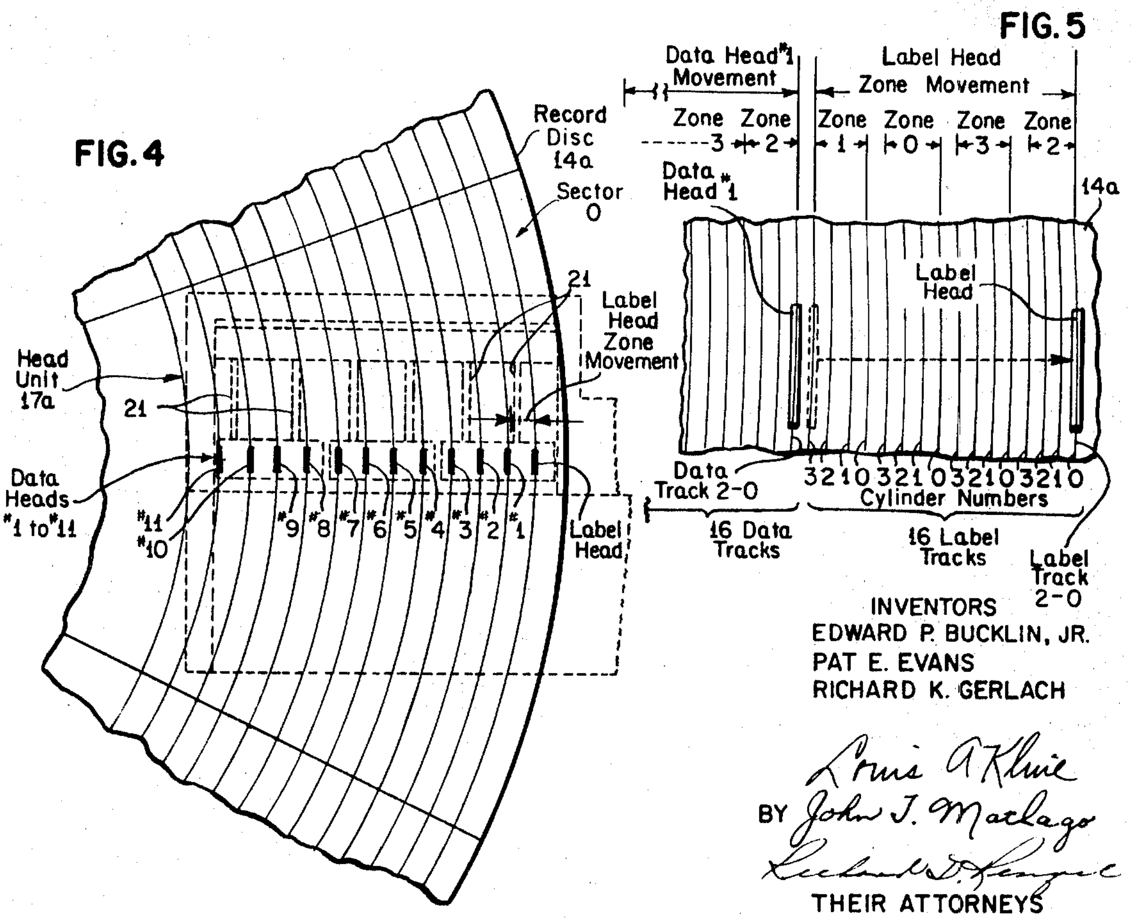
FIGS. 3 to 5 are various detailed views for illustrating recording on the upper-record disc including the cooperating multiple head unit of the Disc File shown in FIG. 2.

Before proceeding with the detailed description of the present invention, it should be noted that reference characters and numbers have been chosen throughout the specification to facilitate the understanding thereof. In accordance therewith, data and label tracks are identified by zone and cylinder, e.g., data track 2–0 is the data track in zone 2, cylinder 0, for the identified read/write head (e.g., data head No. 1 as shown in FIG. 5). Binary digits (bits) have been underlined in the written description to distinguish them from reference numerals and decimal digits. With reference to circuits of the Disc Controller and Disc Units shown in FIGS. 7*a*, 7*b* and 8; the names of the circuits are capitalized, e.g., Unit Decode, and wherever feasible, the names are followed by abbreviations using upper case letters, e.g., Unit Decode UD. Each of the outputs of these circuits is identified as such by an upper case letter followed by a lower case letter, e.g., output Ud for Unit Decode. File Select Latch SL1, Unit Function Latch FL1 and various Counter outputs and gating circuit outputs (FIGS. 7*a*, 7*b*, 8) are expected and are all upper case letters followed by numbers when required to indicate time sequence. A circuit output followed by an asterisk (*) indicates an interface coupling between the Disc Controller and Disc Units. Further, to avoid unnecessary duplication of outputs, e.g., outputs Hc1 to Hc8 of the Control Information Amplifier HC (FIG. 7*a*), represent both true and false outputs and whenever false outputs are specifically required for inputs to other circuits, they are indicated by a prime, e.g., an output Hc1′ from Hc1 is coupled to a gate at the reset input of File Select Latch SL1. Because of the extensive use of the outputs of File Select Latch SL1, for example, the showing of separate true and false outputs as $SL_1$ and $SL_1'$ has been provided. The inputs to the various circuits have been identified by outputs connected thereto in order to facilitate the understanding by reducing the number of required reference characters.

Figure 6:
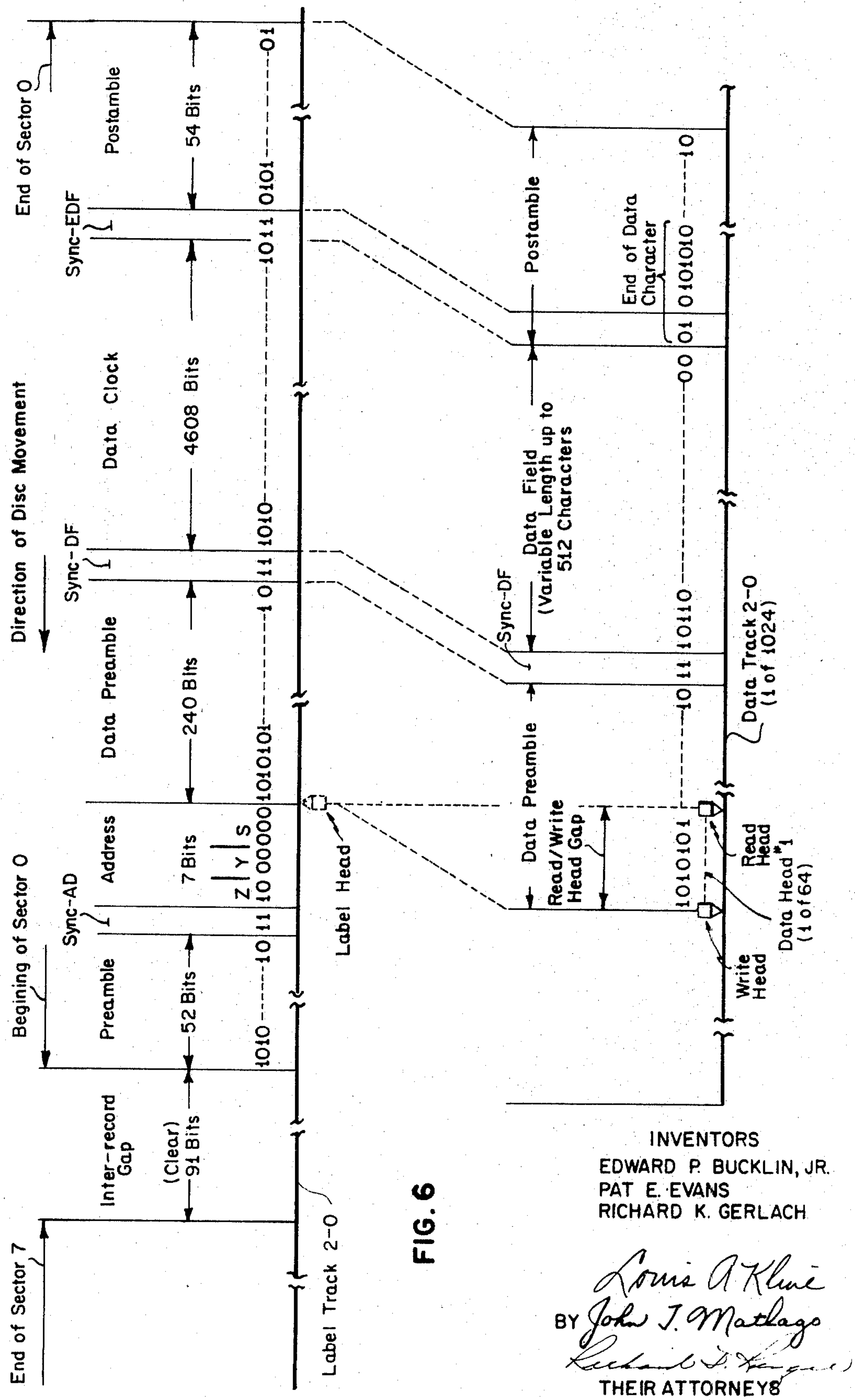
FIG. 6 is a schematic diagram of the recording format of a typical label track and data track on the upper-record record disc for illustrating the operation of accessing any selected data sector storage area of data tracks on the upper record disc of the Disc File shown in FIGS. 2 to 5.

Although the recording formats for only a single data track 2–0 and corresponding label track 2–0 have been shown in FIG. 6, it should be understood that the other data and label tracks have the same respective formats. Preferably, a Manchester-type recording system is employed, but other self-clocked recording techniques can also be used. Conversion of binary signals from conventional high-low level binary signals to signals providing self-clocked recording techniques and vice versa are disclosed in commonly assigned, copending U. S. application, Ser. No. 458,344 of Richard K. Gerlach et al., filed May 24, 1965, and now abandoned for example. Since the present invention is not direct to these conversion operations, no detailed description thereof is provided herein. Further, it will be noted that the above-cited copending application to Gerlach et al. discloses certain desirable features such as amplifier gain control (AGC) which are included herein as part of circuit arrangements and recording format.

DISC FILE (FIGS. 2–6)

A typical random access Disc File O of Disc Unit No. 0 is shown in FIG. 2 to comprise a removable set of three record discs (disc stack 14) and multiple head assembly 16. Each of the three record discs **14*a*, 14*b*, 14*c* provides upper and lower magnetic recording surfaces for cooperating with respective ones of multiple head units 17*a* to 17*f* of the head assembly 16**. These record discs are preferably of the type disclosed in commonly assigned copending U. S. application of Peters et al., Ser. No. 598,292, filed Dec. 1, 1966, and now U. S. Pat. No. 3,466,156.

The multiple head assembly 16 for the Disc File O shown in FIG. 2 is pivotally mounted for positioning the group of six, multiple head units **17*a* to 17*f* for reading and writing information on the respective disc recording surfaces and retracting these head units to provide clearance for removal and insertion of interchangeable disc stacks, such as disc stack 14** in the manner disclosed in commonly assigned, copending U. S. application of Gerlach and Lawrence Ser. No. 585,674, filed Oct. 10, 1966, and now U.S. Pat. No. 3,480,936.

As shown in FIG. 2, the disc stack 14 for a respective Disc File O comprises the three record discs **14*a*, 14*b*, 14*c* secured to one another to be removable as a unit from a spindle 13 of the respective Disc File for interchanging disc stacks 14 in the various Disc Files. Each of the head units 17*a* to 17*f* includes a group of 12 read/write heads for a respective one of the six record surfaces of the disc stack 14 and a common head mount to provide equal lateral spacing of the 12 read/write heads to cooperate with the respective record surface for reading and writing on equally spaced information tracks including both data tracks and label tracks. The head mounts for the respective head units are supported in vertical alignment by the head assembly 16 for common radial movement to 16 different positions over the respective record surfaces by a positioning mechanism of the multiple head assembly 16. Thus, each read/write head, e.g., the label head shown in FIG. 5, is capable of being positioned for individual access to a respective set of sixteen (16) information tracks. The group of twelve (12) heads for a single disc surface, e.g., head unit 17*a* (FIG. 4) is capable of providing individual access to a total of 12 ×16 or 192 information tracks by the radial positioning movements of the positioning mechanism. Total access to information tracks for all 72 read/write heads of assembly 16 for the 16 positions is 16 ×72 or 1,152 information tracks. For convenience, the 72 information tracks accessible at any position of the multiple head assembly is referred to as a "cylinder" and the total number of cylinders is therefore sixteen (16), one cylinder for each of the 16 positions. In any cylinder, the 72 information tracks comprise 64 data storage tracks and eight (8) additional information tracks. Of the eight (8) additional tracks, one track is designated a label track which is read to provide certain control data including timing (clock), identification of the zone and cylinder and the address of any one of eight individually addressable data sectors 0–7 (FIG. 3**) of any one of the disc surfaces adjacent any selected one of the read/write heads. The remaining seven (7) tracks (and heads) are spare tracks which can be used as substitute data tracks, for example, when a data head becomes defective. Also, an additional label track (and head) may be desired on another record disc of a File to avoid writing by a data head in close proximity to a label head to prevent "cross-talk." This is contemplated and a simple selection of one of the label heads is made to assume that the label head selected is not in the same head unit as the selected data head.

Figure 3:
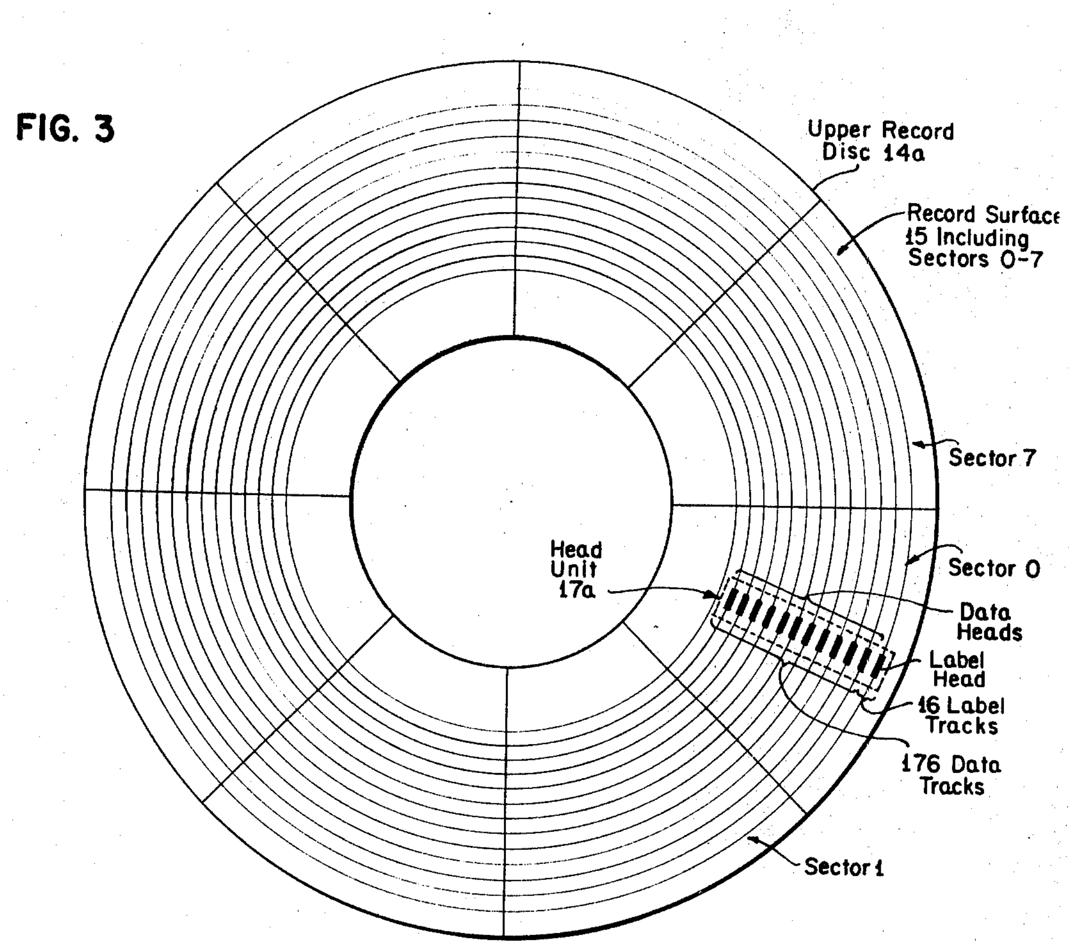

One of the disc surfaces, upper surface 15 of upper record disc **14*a*, including both data and label tracks of the disc stack is shown schematically in FIG. 3 and additional details are shown in FIGS. 4, 5 and 6 to illustrate the manner in which the data is recorded on the disc surfaces which provides a basis for an understanding of the operations of the present system for accessing individual data tracks and any selected one or sequential ones of a group of data sectors 0–7. The entire top record surface 15 of the upper disc 14*a* is shown in FIG. 3 to be divided uniformly into eight radial data sectors 0–7 which surface 15 includes 176 annular data tracks and 16 label tracks. In FIG. 4, one complete data sector (e.g., sector 0) is shown with the multiple head unit 17*a* disposed thereover, and in conjunction with FIG. 5, the manner in which the selective positioning of the head unit 17*a* provides for the Heads No. 1 to No. 11 recording or reproducing in 16 radial different positions on the record surface 15**.

Referring now to FIG. 6, the details of the format of a typical one of the label tracks (label track 2–0) and a selected one of data tracks (data track 2–0) in data sector 0 are shown diagrammatically to clearly illustrate the control operations for accessing the storage area of the selected data track 2–0 in this data sector. The typical label track, as shown, comprises:

1. an inter-record gap between adjacent data sectors 0 and 7 (such a gap is provided between each of the sectors) has been cleared of all signals for delineating sectors by detection of the absence of signals;

2. a preamble of 52 bits, comprising a 10 binary digit (bit) pattern 1010. . . 10 for adjusting the level of the signal output of the label head;
3. synchronization bits, comprising 11 bits (SYNC-AD) following the preamble and preceding the address for actuating control circuits of the addressed Disc Unit (FIG. 7*a*) for reading the address of the respective data track and sector;
4. an address portion (label) of seven bits including the address of the zone, cylinder and sector, e.g., zone 2 (10), cylinder 0 (00), sector 0 (000);
5. data preamble of 240 bits, comprising a 10 (or 01 ) bit pattern which is used as a source of signals for the data preamble on the data track during writing (1010 . . . 10);
6. synchronization bits, comprising 11 bits (SYNC–DF) preceding the data clock of the label track 2–0, for example, for timing and control of circuits for writing data in the data field;
7. data clock comprising a 10 (or 01) bit pattern for clocking the writing of a maximum of 512, nine bit characters (4,608 bits including parity) in the data field of the addressed data track and sector;
8. synchronization bits comprising 11 bits (SYNC–EDF) at the end of the data field for timing and control (terminating) of reading and writing data and initiating operation at the postamble generator during certain writing operations;
9. a postamble of 54 bits comprising a 01 bit pattern (0101 . . . 01).

The typical data track shown in FIG. 6 has been written by data head No. 1 which is identical in construction in every respect to any of the other read/write heads including the label head for the label track. The relative displacement of recorded label and data track signals, as indicated by diagonal dashed lines in FIG. 6, corresponds to the linear displacement between the read and write gaps of a read/write head and in particular the linear displacement of the read head gap of the label head and write head gap of the selected data head No. 1. Since the preamble of the data track (and SYNC–DF) is copied from the label track as a part of the write operation, which occurs immediately upon completion of equal comparison of the desired address and the label (address), the write head of a selected data head No. 1 records the data preamble in the manner shown in FIG. 6. The actual writing of data begins after the synchronization bits (SYNC–DF) when the "write-data" characters are supplied from the Controller 12. For convenience in explanation, 512 characters of data are shown written on the data track such as to occupy the entire data field. It should be noted, however, that the actual data written within the data field is often less than 512 characters and, as a result, the postamble occupies the data field after the data and is, as a consequence, of variable length which will be understood from the description of the operation of the Disc Unit No. 0 infra. On the other hand, the number of characters is limited to a maximum of 512, in accordance with the preferred embodiment of the invention, and any more than 512 is prevented by control of the Disc Unit by signals read from the label track, i.e., synchronization bits (SYNC–EDF).

In operation, immediate access is provided to storage capacity of the 64 data tracks on three record discs of a single Disc File without movement of the 64 data heads of the multiple head assembly 16 shown in FIG. 2. Selection of any one of the 64 data heads of any one Disc File is provided by a six (6) bit address supplied to the selected Disc Unit. Selection of either the read or write head of any selected one of the 64 data heads is provided by an additional "function" bit. Further, an additional "file" bit provides for the selection of either one of the two Disc Files (e.g., Disc File 0 or Disc File 1 of Disc Unit No. 0) whereby the storage capacity of an additional 64 data tracks (total of 128 data tracks) is made available for immediate access without movement of the multiple head assembly 16 of either disc File 0 or 1. It is evident from the foregoing that the four Disc Units No. 0 to No. 3 (FIG. 1), including eight (8) Disc Files which are shown coupled to Disc Controller 12, provide immediate access to an exceedingly large amount of data because of the large number of data tracks always under the data heads of the multiple head assembly of each Disc File.

Referring again to the single Disc File 0 of Disc Unit No. 0 for a description of the data accessing operation of the present invention, access to data tracks not positioned under the 64 data heads of the multiple head assembly 16 at the time of addressing thereof is provided by radial movement to a combination of sixteen (16) zone and cylinder positions of the multiple head assembly 16. As shown in FIG. 5, there are four zones (zones 1, 0, 3, 2) to selectively position each of the read/write heads of the record discs of the File O, e.g., the label head and data head No. 1 are shown by solid lines in FIG. 5 to be positioned over label track 2–0 (zone 2, cylinder 0) of record disc **14*a* and capable of being selectively positioned over any data track in any one of the four (4)zones 1, 0, 3, or 2 by actuation of Zone Positioner 19 (FIG. 2). The determination of the placement or order of the zones 1, 0, 3, 2 is based on statistical analysis of zone to zone movements and this order of zones was found to provide for minimum travel in zone to zone movements. Selective positioning of the label head and a selected data head over any one of four ( 4) data tracks within any one of the zones 0 to 3 is provided by Cylinder Positioner 20 (FIG. 2**).

In view of the foregoing, it should be evident that an address (control information and more particularly the zone of cylinder portions of the address supplied to the Disc Units No. 0 to No. 3 by the Data Processor 10 will produce radial movement of the multiple head assembly 16 of the addressed Disc Unit and File thereof only when the data track to be accessed is not already positioned under one of the data heads. A proper selection of the data track is assured by reading the address portions of the label track and each of the address portions (one for each of the eight sectors) includes a record of the zone 10, cylinder 00 and sector 000 as shown in FIG. 6. A valid comparison of the recorded zone, cylinder and sector addresses on the label track with the addresses supplied by the Processor is required prior to reading or writing data on the addressed data track, and no data access can be performed upon an invalid comparison.

Each of the eight address portions (one address portion near the beginning of each sector) of the label track includes the address of respective radial sector, as noted supra, and accordingly, the sector address (00 to 111) is different for each of the eight sectors 0–7. As previously described, before reading or writing of data, a proper comparison of the sector must be made to provide assurance that the proper sector is being accessed. The only exception to this is when more than one sector of a plurality of sequential sectors is being accessed to read or write an amount of data exceeding 512 characters and requiring more storage capacity than one data sector. Accordingly, whenever the Processor 10 requests access to a data track and storage area of a plurality of data sectors which are physically located in sequential order, the first sector address only will be compared with the first addressed, recorded sector of the plurality of sequential sectors for reading or writing of data in all of the plurality of sectors. Comparison of addresses of the sectors following the first of the plurality sectors is inhibited by the control circuitry of the selected Disc Unit whereby the Disc Unit can continue reading or writing data in all of the plurality of sectors. The details of the control circuitry which provides the foregoing operations will now be set forth in a description of FIGS. 7*a*, 7*b*, 8 and 9 with reference also to signal waveforms of FIGS. 10 to 12.

Referring to FIGS. 2, 2*a* and 2*b*, the positioning of the head assembly 16 to access any selected one of the data tracks is provided by reading the address portions recorded on the label tracks and comparing with the address supplied by the Processor as noted generally, supra. An important feature of the system of the present invention is to provide for reading zone and cylinder addresses recorded on the annular label tracks while moving the head assembly radially to position the label head over the label track having the desired address whereby the selected data head is positioned over the desired one of its respective data tracks. For example, data head No. 1 is positioned over its data track 2–0 (FIG. 5) by locating label track 2–0 and positioning the label head over label track 2–0 as illustrated by the dashed lines in FIG. 5. The steps involved in repositioning the head assembly 16 to position data head No. 1 over data track 2–0 are now described.

The first step is only incidentally involved because of a change from cylinder 3 to cylinder 0. Relative to zone repositioning movements, Cylinder Positioner 20 provides instantaneous movement to reposition the head assembly from cylinder 3 to 0 by solenoid operation. As a result, all zone to zone repositioning movements traverse at least four label tracks or multiples of four label tracks to a maximum of sixteen (16) label tracks including the first and final label tracks. Accordingly, if desired, only every fourth label track need be read during zone to zone repositioning movements.

After cylinder movement and repositioning, therefore, the Zone Positioner 19 proceeds to locate label track 2–0 in accordance with the new address (zone 2, cylinder 0). As the head assembly 16 is being moved radially (during disc rotation at a predetermined minimum speed), the label head traverses the 16 label tracks as shown in FIG. 5 by the dashed arrow, reading the addresses recorded on each label track traversed. When the single one of the label tracks 2–0 is read that has the address (zone 10, cylinder 00), the radial movement of the head assembly 16 is discontinued to precisely position data head No. 1 over the center of its data track 2–0.

In the foregoing repositioning operation, the system of the present invention provides for reading during the radial movement by selectively utilizing the output of the label head to control the Zone Positioner 19 only during time intervals in which the label head is located over the leading edge portions of the individual label tracks and prior to centering on the individual label tracks in order to allow time for delay in response of the Zone Positioner in discontinuing radial movement. Thus, when the desired label track is located by reading the address from the leading edge portion, during the aforementioned time interval prior to centering on the label track, a valid comparison with the desired track address including zone and cylinder only (e.g., zone 2 (10) and cylinder 0 (00)) will be gated to the Zone Positioner 19 to discontinue radial movement and position the label head over the center of this desired label track. Centering of the label head on the desired label track centers the data heads of the head assembly 16 over the corresponding data tracks indexed thereby including the aforementioned centering of the selected data head No. 1 over the addressed data track 2–0.

The control signal for producing the desired time intervals for reading the individual label tracks during radial (zone to zone) repositioning movements of head assembly 16 is provided by cam 18 mounted on the shaft of motor 18*m* (FIG. 2) and switch 18*b* having a cam follower 18*c* which is actuated by cam lobe 18*a* for radial outward movements as shown in FIGS. 2*a* and 2*b* to produce a high level logical control signal (+4v) at switch output RFY. The position of cam lobe 18*a* relative to the position of the head assembly is such that the label head is located over any one of the label tracks, but not yet centered over the label track. In FIG. 2b, the label head is shown diagrammatically (solid lines) to be so located radially over label track 2–0 and the angular position of cam 18, as shown in FIG. 2*a*, corresponds to this radial location of the label head. The time interval switch 18*b* is actuated by cam lobe 18*a*, in less than one revolution of the disc 14*a* and the label head is centered over label track 2–0 immediately after the lobe 18*a* passes cam follower 18*c*. During this brief time interval of actuation of switch 18*b*, the zone and cylinder addresses are read from label track 2–0 and compared with the desired zone and cylinder address supplied by the Processor 10. Upon a valid comparison, the radial movement of the head assembly 16 is discontinued by deenergization of motor 18*m* and the motor shaft rotation is stopped at an indexed detent position locating the cam follower 18 between lobes 18*a* and 18*d* as indicated by the center line in FIG. 2*a*. When the motor shaft is stopped, the label head is in its final position centered on the label track 2–0 as shown by the dashed lines for the label head in FIG. 2*b*.

The foregoing arrangement provides for precise centering of the data heads No. 1 to No. 64 over the respective data tracks for zone 2, cylinder 0 position of the head assembly 16 and the head assembly 16 is positioned to the other fifteen (15) positions in a similar manner whenever the radial movement of the head assembly involves zone to zone repositioning and the radial movement is in the "OuT" direction toward the periphery of the discs. When the zone to zone movement involves a radial movement in the opposite "IN" direction (toward the center of the disc 14*a*), the direction of cam rotation is as shown by the dashed arrow in FIG. 2*a*, and the cam lobe 18*d* is used to actuate switch 18*b* to produce the high level logical output RFY in the same manner as described supra to position the head assembly for accessing the addressed data track. Alternatively, in order to provide for reading only every fourth label track instead of reading every label track traversed in zone to zone movements, the cam 18 is coupled to the motor shaft by a 4:1 gear ratio, for example. The advantage of this arrangement for reading only every fourth label track is to eliminate potential errors in reading and comparing addresses of the other label tracks.

In addition to providing for precise centering of the data heads of the head assembly 16 for accessing any addressed data track, the foregoing arrangement is important to provide for elimination of noise from the control system while the label head is traversing the boundary between adjacent label tracks including any overlap of adjacent label tracks. During the transition, when the label head is positioned over two adjacent label tracks, the address read-out is indeterminate (noise condition) which is eliminated by the foregoing arrangement. It should be noted that the recording of label tracks (and data tracks) is "write wide and read narrow" which accounts for the label tracks being shown in FIG. 2*b* as being twice as wide as the label head, i.e., the read head portion of the read/write head designated as the label head. The desired high track density accounts for the close spacing of the label tracks as shown diagrammatically in FIG. 2*b*. To summarize, the present arrangement provides important features enabling the present disc system to selectively position the head assembly radially by reading the addresses on the label tracks during continuous radial movement in order to access any selected data track. By these features, the need of stopping and starting on each label track to read the zone and cylinder addresses is avoided. In this regard, it should be noted that the radial movement of the head assembly 16 need not be slowed up to provide for a complete revolution of the disc for reading each label track but need only provide for reading a portion of the label track (including one or more sectors) in substantially less than one revolution since the zone and cylinder addresses are recorded in each of the eight sectors thereof. Accordingly, in the time interval provided, the control system provides for elimination of comparison of the sector address whenever the head assembly 16 is being repositioned in a zone to zone movement. After the head assembly 16 is properly positioned and the radial movement is stopped, the recorded sector address is again necessary for a proper comparison to access the desired data in the addressed sector except in multiple sector accessing operations as will be described in detail, infra.

DISC UNIT CONTROL SYSTEM (FIG. 7)

The schematic block diagram of FIG. 7 shows the control system arrangement for exemplary Disc Unit No. 0. A more detailed disclosure is set forth later in connection with the detailed showing of the control system in FIGS. 7*a* and 7*b*. In FIG. 7, additional blocks for Data Processor 10 and Disc Controller 12 are shown to indicate the source of data and control signals for Disc Unit No. 0 and other Disc Units No. 1 to No. 3. The data flow for reading or writing in data sections of the data tracks selected by the control signals is indicated by lines designated Data in FIG. 7.

The data flow for writing in any selected one or more data sectors of the selected Disc File 0 or 1 of Disc Unit No. 0 is from Processor 10 via Controller 12 to Write Circuits WDG and then to the Write Matrix 0 or 1 of the selected one of the Disc Files 0 or 1. Assuming the Disc File 0 is selected, for example, the data is directed to any selected one of the data heads of the Multiple Head Assembly 16 (File 0) in accordance with the control signals for head selection which are stored in the H Register. The data is gated at the time the selected data head enters the data field (FIG. 6) of the selected data track and sector and clock pulses for timing and writing the data are provided by the Read Circuits and label head reading the label track during writing of data. The label head is reading from one of the label tracks except during actual reading of the selected data track as indicated in FIG. 6. The data preamble (FIG. 6), which is prior to the data, is also provided by this label head prior to writing the data. Since each data sector is capable of storing 512 characters and the number of characters is variable, the write operation includes writing the postamble in the selected data sector which is a detail described in detail later and shown in FIGS. 7*a* and 7*b*.

Reading of data by a selected one of the data heads of Head Assembly 16 (File 0) for example, supplies the data to Processor 10 from the desired data sectors of File 0. The present invention provides a Single Read Amplifier and Read Circuits for both data and label heads of Files 0 and 1. Accordingly, the Read Circuits are shared by the Label and Data Heads during reading of either of the Disc Files 0 and 1 and the Read Circuits shown are common thereto. The data read from the desired data sectors is provided at the same output as the information read from the label tracks including timing and address signals, and the Read Enable provides either a label enable signal for gating the output of the label head through label gate 0 or a matrix enable signal for gating data outputs of the selected data head No. 1 File 0, for example, through the Read Matrix to the Read Circuits. The data from the Read Circuits is coupled to the Processor 10 via Controller 12 and the address signals from the label head, for example, are coupled to the Address Comparison Circuits.

The control system for each of the Disc Units provides control for both of their respective pair of Disc Files 0 and 1. Most of the control circuits for each of the Disc Units are shared by Files 0 and 1. The exceptions are evident in FIG. 7, showing exemplary Disc Unit No. 0, e.g., the Zone/Cylinder Address and Storage Comparison circuits. The control information characters (FIG. 9) supplied to the Disc Unit No. 0, as shown in FIG. 7, are coupled from the Controller 12 to Selection Circuits 70. These Selection Circuits 70 provide for selectively coupling the address signals for Unit No. 0 to the proper Zone/Cylinder Address Storage and Comparison circuits to compare the new and old zone and cylinder addresses and, if different, to produce control signals for Zone and Cylinder Positioner 19–20 (File 0) for repositioning the Head Assembly 16 (File 0), for example. During repositioning, the new address is compared with the zone and cylinder address signals read from the label tracks (address from label) by the label head during radial movement of the Head Assembly 16. Upon locating the Head Assembly 16 to the new address, the label head reads zone and cylinder addresses which are the same as the new address (zone and cylinder addresses) whereupon sector address comparison is made to locate the addressed data sector on the revolving disc. The sector address read from the located label track is compared and upon locating the sector according to the new address, the Label Comparison Circuits are responsive to the valid compare outputs of the Zone, Cylinder and Sector Comparison circuits to produce an "equal compare" output pulse SeC that is coupled to the Read Enable LME and Write Enable WE circuits to produce either a read or enable output according to the function selection and output of Read/Write Latch RDF. The output pulse SeC of the Label Comparison Circuits is also coupled to the Controller 12 to obtain a data channel or line to the Processor 10 for the reading or writing of data in the addressed data sector and the enabling signals are gated only upon condition the data channel to the Processor 10 is obtained.

ADDRESS LOADING TIMING CONTROL (FIGS. 7*a*, 7*b*, 8, 9)

The selection of any one of the eight Disc Files provided by the Disc Units No. 0 to No. 3 of FIG. 1 is provided by a series of control information characters U, F, S, A, N (FIG. 9) supplied by Processor 10 via control information lines Ci1–8 from the Controller 12. The control information characters are provided parallel by bit, serial by character, and the individual bits 1 to 8 of these control characters are available at outputs Hc1–8 respectively of Control Information Amplifier HC (FIG. 7*a*) during sequential intervals of time defined by a series of load control pulses JC2.

The first (1st) control character U, for example, contains the address of the selected one of Disc Units No. 0 to No. 3 and the desired one of the two respective Disc Files 0 or 1 thereof. Only the three least significant bits of character U contain this address, and the remaining bits contain no address information. In order to properly apply each of the individual control characters to the selected one of the Units No. 0 to No. 3, the series of load control pulses JC2 including pulses TU, TF, TS, TA and TN (signals, FIG. 10) from Controller 12 are applied to each of the four Disc Units No. 0 to No. 3. Only in the addressed Unit No 0 are the load control pulses effective to gate bits of the control information characters from the outputs Hc1–8 of Control Information Amplifier to the proper storage and control circuits of the Disc Unit No. 0. The first load control pulse TU gates the second and third bits of the first control character U to the Unit Decode UD. Unit Decode output Ud gates the first bit 0 (Cc1′) to File Select Latch SL1 to produce output $SL_1'$ to select Disc File 0. Only the single addressed Disc Unit No. 0 will produce a series of unit response (answer-back) pulses at output UABO* (FIG. 7*a*) which is coupled back to the Disc Controller 12 to indicate a Disc Unit No. 0 selection has been made.

In response to the second and third least significant bits, the decoder (Unit Decode UD, FIG. 7*a*) of the selected Disc Unit No. 0 produces a high level (+4v) output Ud to set its Unit Select Latch USLI (FIG. 7*a*) which produces high level output $USL_1$ (signal, FIG. 10) for gating the series of load control pulses JC2 to product unit "answer-back" pulses at output UABO* to the Controller.

The second control character is function character F (FIG. 9) which contains the read or write function information (01 for read or 10 for write) to the addressed Disc Unit No. 0 to set or reset Read/Write Latch RDF (FIG. 7*a*). Only the first and second least significant bits of the function character contain information of which only the least significant (e.g., 0) bit, available at output HCl (Hc1′) is gated to the Read/Write Latch RDF by the second load control pulse TF. The second most significant bit 1 (Hc2) of the function character is not utilized since its only significance is as a check bit in combination with the other bit for "odd" combination, i.e., either 10 or 01 to assure a proper function character is being transmitted. As noted earlier, only the true outputs Hc1–8 are shown at the amplifier HC to avoid undue repetition and false outputs Hc1′–8′ are implied.

The third control character, the S character (FIG. 9), contains the zone address (two bits 10 or zone 2), cylinder address (two bits 00 or cylinder 0), and the least significant bit 1, for data head No. 1 selection. The corresponding third load control pulse TS, and File Select Latch output $SL_1'$ (File 0), gates the zone and cylinder address bits to the zone and cylinder address Registers ZO and YO respectively, of the selected Disc File 0 (FIG. 7*a*). As noted earlier, Disc File 0 selection was made in accordance with the least significant bit 0 of the first character U (single bit Disc File address) for selection or setting of its File Select Latch SL1 which provides output $SL_1'$, for selection of Disc File 0 of the selected Disc Unit No. 0, for example. The third load control pulse TS is also applied to register latch H1 of the H Register (head address register, FIG. 7*b*), which is common to both Disc Files 0 and 1, to gate the least significant bit 1 into the corresponding register latch H1 for selection of data head No. 1.

The fourth load control pulse TA provides for gating the sector bits 000 and remainder of the head address bits 00000 of the fourth control character A to the S Register (FIG. 7*a*) and the H Register (FIG. 7*b*) respectively, which are common to the Disc Files 0 and 1 of the selected Disc Unit No. 0. The fifth control character is gated by the fifth control pulse TN which pulse is the last of this series of control pulses JC2. Control pulse TN is applied to Sector Counter N (FIG. 7*a*), also common to the disc Files 0 and 1 of the selected Disc Unit No. 0, to gate the three least significant bits of the fifth control character N to set the number of sectors (e.g., bits 100 or sectors 0–4) to be accessed sequentially. This control pulse TN is also gated by output $USL_1$ to set Unit Function Latch FL1 (FIG. 7*a*) to provide high level output $FL_1$. Subsequent attempted selection of Disc Unit No. 0 prior to completion of accessing data under the current selection is prevented by setting Unit Function Latch FL1 until completion of data access, for example, in a manner disclosed in detail later.

ADDRESS COMPARISON AND HEAD POSITIONING (FIGS. 7*a*, 7*b*)

The control operations described previously provide for exemplary addressing Disc Unit No. 0, File 0 including data track 2–0, sector 0 and five sequential sectors (0–4) thereof. In response to the foregoing control operations, the Disc Unit No. 0 is selected and thereby prepared to locate the addressed data track 2–0 by reading the label tracks traversed by the label head during zone movement of the head unit 17*a* (FIG. 7*b*) to compare signals from the zone addresses recorded on the label tracks with the new zone address (e.g., zone address 10) supplied by Control Information Amplifier outputs Hc4–5 and gated by load control pulse TS and output $SL_1'$ (Disc File 0). These gated outputs Hc4–5 are also applied to an initial comparison circuit, including a RUN Compare circuit 72, which provides for immediate, preliminary comparison of the old zone address bits (e.g., 01) stored in the ZO Register and the new zone address bits supplied by gated outputs Hc4–5. This preliminary comparison is made because the new zone address is very likely to be the same as the old zone address due to the large number of data tracks (4 ×64 or 256) within a single zone. Further, it is intended that storage locations of data tracks within a single zone provide sufficient storage capacity (e.g., 1,000,000 characters) for all data including instructions that may be required in many instances for a single program of the data Processor 10 for which the Disc File and Unit serves as a peripheral.

During the time period of load control pulse TS and prior to setting ZO Register, therefor, the new zone address (e.g., 10) is compared with the old zone address. Whenever the new and old zone address bits are the same (equal compare), RUN Latch is not set and the new address is not gated into the ZO Register. Whenever new and old zone addresses are different (no compare), RUN Latch is set by the inverted output of the RUN Compare circuit 72 to produce a high level signal (+4v) at output RuN which gates the new address to the ZO Register to set latches ZO1–2 from the old zone address 01 to this new address 10. In addition, the comparison of old and new zone addresses by IN–OUT Compare circuit 74 provides for setting IN–OUT Latch to produce a signal at output OuT which is coupled to Zone Positioner 19 along with the signal from output RuN to position the selected data head No. 1 over the addressed data track in the addressed zone, e.g., zone 2. According to this exemplary zone address, the logical comparison results in both RuN and OuT high level outputs since zone 2 is the outermost zone (see FIG. 5). If the desired zone movement is inward, instead of outward, only a high level signal at output RuN is required since the Zone Positioner 19 will move the read/write heads of head unit 17*a* inward in the absence of a high level signal at the output OuT of the IN-OUT Latch.

In the process of locating data head No. 1 over the addressed data track, the preliminary comparison described supra, couples the outputs RuN and OuT to Zone Positioner 19 (FIG. 7*b*) to provide for zone positioning which includes radial movement of the Head Assembly 16 until "equal compare" signals are produced at outputs ZcO and YcO of Zone and Cylinder Address Comparison circuits ZCO and YCO, respectively. It should be noted that the high level RuN and OuT outputs will be produced until movement by the Zone Positioner 19 locates data head No. 1 over the addressed data track 2–0 in accordance with the description which follows.

In the cylinder address operation, the cylinder address outputs Hc2 and Hc3 of the Control Information Amplifier HC (FIG. 7*a*) set the YO (cylinder) Register during control pulse TS to the new address (e.g., 00). Outputs $YO_1$ and $YO_2$ of the YO Register are coupled to Cylinder Positioner 20 which operates respective solenoids thereof according to the new setting of the YO Register. In addition, the outputs of YO Register are also applied to Cylinder Address Comparison Circuit YCO in order to provide an "equal compare" output YcO whenever the new cylinder address corresponds to the cylinder address 00 read-out from any cylinder 0 label track and the second bit ($ZO_2$) of the zone address corresponds to read-out (ReD) thereof from the label track.

The foregoing comparison of the zone address and cylinder address is provided by comparing the addresses stored in the respective registers and the address signals read from the label tracks (e.g., label track 2–0) as produced at the read output ReD (signal, FIG. 12) of Read Output Circuits RED (FIG. 7*b*). This read output ReD and Label Bit Counter outputs or address bit counts BC1–2 and BC3–4 (FIG. 7*a*) therefor, are coupled to the respective comparison circuits. The address bit counts BC1–2 gate respective outputs $ZO_1$ and $ZO_2$ for comparison with zone address signals supplied output ReD at address bit times BC1 and BC2 respectively in accordance with the following logical equations:

$$ZcO = SL_1'\ BC1\ (ZO_1\ ReD + ZO_1'\ ReD') \quad (1)$$

$$ZcOa = SL_1'\ BC2\ (ZO_2\ ReD + ZO_2'\ ReD') \quad (2)$$

It should be noted that "equal compare" output ZcO, equation (1), is only dependent upon the first bit of the zone address and is used to set Label Comparison Circuit LC which is reset upon no valid comparison of the second zone address bit or the cylinder address bits. Accordingly, the logical equation for a valid comparison of the zone and cylinder addresses for locating the addressed data track includes the second bit of the zone address during bit count BC2 and the cylinder address comparison during bit counts BC3–4 expressed by the following equation for resetting:

$$YcO = SL_1'[ReD\ (ZO_2\ BC2 + YO_1\ BC3 + YO_2\ BC4) + ReD'\ (ZO_2'BC2'\ YO_1\ BC3 + YO_2'\ BC4)] \quad (3)$$

It should be noted again that the diagrammatic showing of FIGS. 7*a* and 7*b* has been simplified for clarity by not showing the prime output, and the logical equations are purposely inserted herein to clarify the manner in which the diagrams have been simplified.

Only the foregoing comparisons are provided for zone to zone repositioning of the Head Assembly 16 to locate the selected data head No. 1 over data track 2–0, for example. Location of data head No. 1 over data track 2–0 by positioning the label head over corresponding label track 2–0 provides the output ReD (read-out of zone and cylinder addresses as recorded on label track 2–0) which output ReD, when compared with the new zone and cylinder addresses, maintains high level output Lc to the end of the address which is then gated by output BCO (signal, FIG. 11) to Address Compare Circuit SEC to produce pulse at output SeC ("equal compare") indicating the addressed data track 2–0 has been located. The output SeC is gated by output RFY (FIG. 2a) to RUN and OUT Latches to discontinue radial movement of the Head Assembly 16. This comparison does not include the (initial) sector address comparison required for enabling reading or writing of data or for a Unit No. 0 request signal at output SeCO* for Controller 12 to obtain a data channel to the Processor 10. Accordingly, after the label head has been located over track 2–0, for example, the addressed data sector is then located by requiring a high level voltage (+4) at output Sc0–1 during address bit counts BC5–7 instead of the high level output RuN during counts BC5–7. A high level output Sc0–1 is produced upon "compare" of the new sector address at outputs S1–3 and the address read from the label track 2–0 (File 0) according to the following logical equation:

$$Sc0\text{–}1 = SL_1' \,[ReD\,(S_1\,BC5 + S_1\,BC6 + S_3\,BC7) + ReD'\,(S_1'\,BC5 + S_2'\,BC6 + S_3'\,BC7)] \quad (4)$$

The Label Comparison Circuit is reset within each data sector and at the beginning of the data field by output DF (FIG. 11) provided by Sync Bit Detector and Counter SBD (FIG. 7a).

It should be noted that the foregoing address comparison includes a sector comparison requiring an "equal compare" output Sc0–1 only on the first sector whenever multiple sectors are specified by the N character (FIG. 9) and the setting of the Sector Counter N. Accordingly, after the first sector has been located, addresses of subsequent sectors are not compared and the outputs UhC* (signal, FIG. 10) and NeO' (signal, FIG. 10) provide the required high level at output ZYSO during address bit counts BC5–7 to produce the pulse at output SeC in each of the subsequent sectors. Since the zone and cylinder addresses do not change (same data track 2–0) in multiple sector operations, it is assumed that high level comparison outputs ZcO and YcO will be provided during address bit counts BC1–4 in each sector of multiple sector operations.

READ/WRITE OPERATIONS (FIGS. 6, 7a, 7b)

Prior to beginning of each read or write data operation on the selected data track (e.g., data track 2–0) by a selected one of Disc Units No. 0 to No. 3 (e.g., Unit No. 0, Disc File O), the label head of the selected Disc File 0 is positioned as described supra, on the proper one (e.g., label track 2–0) of the 16 label tracks to read zone 10 and cylinder 00 address signals which compare identically with the new zone and cylinder addresses stored in the corresponding Zone and Cylinder Registers ZO, YO for the selected File. Further, it is assumed that the sector has been located and the first sector address 000 is read by this label head and compared identically to the sector address 000 (stored in latches S1–3 of the Sector Register S.

The read circuitry for address signals includes a Single Read Amplifier SRA which amplifies the signals from the label head to provide the desired signal level for Read Output Circuits RED (FIG. 7b). The label read enable output LmE (signal, FIG. 11), supplied by Label Read Enable Circuit (latch) LME, gates the output of the label head of Disc File O to Read Amplifier SRA. The Read Output Circuits RED convert the output of Read Amplifier from Manchester-type recording, for example, to provide binary signals (+4v high -level, bit 1, or low level bit 0) at output ReD (signal, FIG. 12) which binary signals are supplied to the comparison circuits as shown in FIG. 7a. The Read Amplifier SRA of the selected Disc Unit No. 0 is continuously operative for amplification of the signals read from the label track 2–0 except during the actual time period for reading from the selected data track 2–0 (FIG. 6). During a write operation, this read amplifier is operative continuously to amplify the signals read from the label track 2–0 to supply data preamble signals, synchronization signals and data clock pulses for writing on the selected data track for reasons explained in the later description of the write operation.

In read operations, switching is provided from the output of the label head to the selected data head No. 1, for example, as shown in FIG. 6. This switching is produced by changing the state of the Label Read Enable Circuit LME to produce a high level output LME'. The pulse at output SeC is gated to the reset input of Label Read Enable Circuit LME (to produce high level output LmE') by output RdF (read operation) of Read/Write Latch RDF and output $FL_1$ of Unit Function Latch FL1. As shown in FIG. 7b, the output LmE' is gated by output $SL_1'$ to produce a high level data read enable output ReO which is applied to input of Read Matrix 0. This read enable signal ReO enables Read Matrix 0 to pass signals, read from the selected data (read) head No. 1 over data track 2–0 shown in FIG. 6, to the Read Amplifier SRA. At the same instant and for the duration of time output LmE' is at the high level, read signals from the label head to the Read Amplifier SRA are blocked by low level output LmE (signal, FIG. 11). Thus, the Read Amplifier SRA amplifies the output of data (read) head No. 1 including the data preamble and synchronization bits followed by the data signals and postamble from the selected data track 2–0 (FIG. 6). The data preamble of data track 2–0 is used to set the gain of the Read Amplifier SRA for data head No. 1 and the data preamble is of duration sufficient to provide time to establish the proper gain (AGC) of this amplifier while reading from the data track. The end of the "data preamble" of data track 2–0 is marked by the presence of synchronization bits 11 (SYNC–DF) which are detected by a signal crossover detector circuit in the Read Output Circuits RED to produce crossover OUTPUT XoD which is gated at the input of the Sync Bit Detector and Counter SBD (FIG. &a) to change its state from a high level at output AD (address to a high level at output DF (data field). The Sync Bit Detector and Counter SBD is advanced from the state providing output AD, to output DF by a synchronization pulse at gate output SyC (signal, FIG. 12) produced by selective gating of crossover signal output XoD (FIG. 12) produced by synchronization bits 11 (SYNC–DF). Selective gating of output XoD for synchronization bits 11 from the Read Output Circuits RED is provided by gate output SBE having inputs coupled to output BCO' and the output of a Nand gate as shown in FIG. 7a. The gate output SBE is at a low level during the address portion of each label track (BCO') and during data field portion when reading from the data track.

The output ReD of the Read Output Circuits RED (FIG. 7b) is gated by outputs DF and UhC* (data field and Unit No. 0 has Controller) to provide the data signals at output RD* to the Processor 10 via the Controller 12. The reading of data along the data track 2–0 (FIG. 6) is terminated by detection of the "end-of-data" character (FIG. 6) which is detected by the Parity Checking Circuit PC (FIG. 8) of the Controller 12 to produce an output EoD* (End of Data Latch EOD, FIG. 8). This output EoD* (signal, FIG. 11) is coupled to Label Read Enable Circuit LME (FIG. 7a) to set the latter to produce high level output (+4v) LmE. Setting of Label Read Enable LME at the end of each sector, is assured by output CgD of the Clock Gap Detector CGD (FIG. 7a) which detects the absence of recorded signals on the label track in the inter-record gap (FIG. 6) between each of the sectors. The remaining set input is provided by output DF and UhC*' to provide for instances in which the Controller 12 is requested but not obtained in which event an immediate return to the label track (high level output LmE) is provided. The return of high level signal at output LmE gates the signals from the label head to the Read Amplifier SRA and blocks any noise or other signals from data head No. 1 to the Read Amplifier SRA. The position of the "end-of-data" character along the data track 2–0 within the data field or at the end of the data field, as shown in FIG. 6, varies with the number of data characters (up to 512 characters). In FIG. 6, 512 characters is shown to occupy the entire data field and the "end-of-data" character beings with a 0 bit, which is one bit after the end of the data field and remaining eight bits that extend into the postamble. The manner in which the end-of-data character is produced in postamble generation and recording will be described infra as part of the exemplary write operation.

In the write operation, the selected label track 2–0 is read continuously as noted earlier and coupling of label signals to the Read Amplifier SRA is not interrupted during the writing of signals on the selected data track 2–0. The label signals at the output ReD of the Read Output Circuits RED (FIG. 7*b*) and the clock pulses C are coupled to Write Data Generator WDG having outputs coupled to Write Matrices 0 and 1. After an "equal compare" address comparison (including sector address comparison) producing the pulse SeC, as described before for a read operation, a write enable signal is produced by Write Matrix Enable Circuit WE (FIG. 7*a*) at output We (signal, FIG. 11) and gated by output $SL_1'$ to produce an enable signal at output WeO to the selected Write Matrix 0 (FIG. 7*b*) to pass signals from the output WrO of Write Data Generator WDG to the selected data (write) head No. 1 for writing on the selected data track 2–0.

Recording on the data track 2–0, during a write operation, begins with the data preamble (FIG. 6). The data preamble is read from the label track 2–0 and available at output ReD which is gated by outputs DF' and PaL' to the Write Data Generator WDG (FIG. 7*b*) for copying the data preamble and the synchronization bits (SYNC–DF) onto the data track. Upon reading the synchronization bits (SYNC–DF) from the label track, the data signals from the output WD*, which are supplied from the Processor 10 via Controller 12, are coupled to the input of Writer Data Generator WDG and converted to Manchester-type signals to be written onto the data track 2–0 with timing provided by the clock pulses C from the label track. The output EoD* from the Controller 12 or output EDE, end-of-date field of the Synchronization Bit Detector and Counter SBD (FIG. 7*a*), sets Postamble Latch PAL (FIG. &*b*) to produce high level output $PaL_1$ which gates the clock C to Postamble Generator PAG to produce the postamble signal at output PaG. The postamble signal at output PaG is coupled to the input of Write Data Generator WDG (FIG. 7*b*) to write the postamble (Manchester or other self-clocked binary signal) on the data track 2–0 until the end of the data sector. The end of the data sector is detected by the Clock Gap Detector CGD (FIG. 7*a*) providing output CgD which is gated by output UhC* (from Controller) to produce end of sector output signal ESR (signal, FIG. 11) to discontinue writing postamble by resetting the Write Matrix Enable Circuit WE (FIG. 7*a*) to produce a high level signal at output We' to reset the Postamble Latch PAL. The Postamble Latch output PaL' is coupled to the Postamble Generator PAG to reset this latter circuit to a state for beginning the next postamble with a 0 bit which is necessary to provide for generation of the end-of-data character in the first character of the postamble on the data track 2–0 as shown in FIG. 6.

Rear or write operations are continued in subsequent sectors after sector 000 in multiple sectors (e.g., sectors 0 to 5) until Sector Counter N is decremented to zero by the return to high level at output BCO' (produced each sector after reading the label address when the Unit has the Controller, i.e., high level output UhC*) to provide a high level output NeO. This output NeO, in combination with a high level gate output EFR (see reset input of Unit Function Latch FL1, FIG. 7a), terminates either read or write operations in Disc File 0, Disc Unit No. 0 by a high level output EFRO* which is coupled to the Controller 12 to reset a latch of Unit Priority Control UPC (FIG. 8) to discontinue high level output UhC* (Unit has Controller) for Unit No. 0. The high level gate output EFR is produced only when the function of Unit No. 0 has been completed including one or more data sectors (e.g., 5 sectors) that are being accessed by the Processor 10. Accordingly, an end of sector reset pulse output ESR (signal, FIG. 11) is provided at the end of each sector by detection of the inter-record gap (high level output CgD) and output UhC*. In order to terminate read operations earlier, and thereby minimize the time Unit No. 0 is using the Controller, gate output ESR produces an earlier pulse (signal, FIG. 11) by detection of high level outputs UhC*, EoD*, RdF and NeO.

Whenever the other Disc File 1 of Disc Unit No. 0 is selected for reading or writing, instead of File 0, the File Select Latch SL1 (FIG. 7a) is set by output Hc1 and Ud to produce a high level output $SL_1$ which produces read enable signal Re1 or write enable signal We1 (FIG. 7*b*) instead of signals Re0 or We0 to enable the respective Read Matrix 1 or Write Matrix 1 whereby reading or writing data is performed on any selected one of the data tracks of Disc File 1. The signals from the label head of Disc File 1 are gated by output LmE and output $SL_1$ in a corresponding manner as for Disc File 0 which has been described and shown in FIG. 7*b*.

DISC CONTROLLER (FIG. 8)

The Disc Controller 12, shown schematically in FIG. 8, includes a Buffer Register BR for controlling transfer of data between the Processor 10 and the Disc Units No. 0 to No. 3. Buffer Register BR receives and stores write-data from the Processor 10, in parallel by character (eight bits +parity bit), and transmits this data, serial by bit via write-data line WD*, to any selected one of the Disc Units No. 0 to No. 3 for recording on an addressed data sector (FIG. 3) during write operations. During read operations, the Buffer Register BR receives and stores data serial by bit from any selected one of the Disc Units No. 0 to No. 3 via read-data line RD* and transmits this data in parallel by character to the Processor 10 via lines BR1–9.

In write operations, the Buffer Registers BR, which may include more than one register for storing a plurality of characters, requests a data character from the Processor 10 upon receipt of a write enable signal from output We* of the selected Disc Unit whenever the control circuits for the Buffer REgister indicate space is available for storage of the character therein. A channel request signal CR is produced by the control circuits of the Buffer Register BR and transmitted to the Processor 10 which produces a response signal PAB (Processor Answer-Back) during character transfer which signal terminates the channel request signal CR. The character received is transferred (serial by bit) to the selected Disc Unit, and upon completion of transfer, or provision of additional registers and one is empty a channel request signal CR is again set to the Processor 10 for the next character. The foregoing operations are repeated until the last of a predetermined group of characters is transferred from the Processor 10 to the Buffer Register BR at which time the Processor transmits a sector completion signal PT. Upon completion of transfer of the last character for the disc sector from the Buffer Register BR to the selected Disc Unit via output WD*, a signal at output BRE (Buffer Register empty) is produced and gated by completion signal PT to set End-of-Data Latch EOD to produce a pulse at output EoD*. This pulse output EoD* is coupled to the selected Disc Unit (e.g., Disc Unit No. 0) to complete the write operation including the postamble as shown in FIG. 6.

In read operations, the data transfer, serial by bit, from the selected Disc Unit (e.g., Disc Unit No. 0) via output Rd* is stored in the Buffer Register BR. Upon receipt of the last bit of a character from output RD* of the selected Disc Unit No. 0, for example, channel request signal CR is coupled to the processor 10, and upon response signal PAB being received, the character stored in Buffer Register BR is transferred, parallel by character, to the Processor. The mode of operation of the processor, and the Controller, i.e., read or write, is controlled by the levels of one or the other of signals Re*, We* from the selected Disc Unit. Loading and unloading of the Buffer Register BR (serial by bit) are controlled by clock pulses C*, supplied from the selected Disc Unit, and Controller Bit Counter CBC having output CBC1–9 which are coupled to Buffer Register BR. Completion of the read operation is detected by the end-of-data character which, as shown in FIG. 6, includes a 01 bit pattern in which the ninth bit (parity) is a 0 bit. In order to detect the end-of-data character in a read operation, each character stored in the Buffer Register BR is compared in the Parity Bit Checking Circuit PC and detection of the combination of the 01 bit pattern including a 0 parity bit produces a signal at output Pc. This output Pc is coupled to End-of-Data Latch EOD for producing a high level signal on output EoD* (FIG. 11) which, in turn, is coupled to the selected Disc Unit No. 0, for example, to switch from reading the data track to the label track.

Selection of the Disc 12 is provided by the Processor 10 in order to send control information to the Disc Units No. 0 to No. 3. The Processor 10 supplies the control information (characters) and timing signals JC1 and JC3 and load control pulses JC2. An initial control information character (not shown) precedes the five control information characters U, F, S, A, N (FIG. 9) which initial character contains the address of Controller 12. This address is decoded by the Controller Address Decoder CIL (FIG. 8) to select Disc Controller 12 and high output CiL (FIG. 10) is produced to gate the series of five load control pulses JC2 from the Processor to Timing Pulse Counter TPC. The outputs of the Counter TPC are coupled to the Disc Units No. 0 to No. 3 for timing of selection and control operations thereof and described supra in connection with FIG. 7*a*. Timing signal JC3 from the Processor 10 is at a high level during the entire selection sequence and returns to low level after the last of pulses JC2 to reset Controller Address Decoder CIL and Counter TPC.

The five control information characters (FIG. 9) are transmitted, parallel by bit, to the Disc Units No. 0 to No. 3 via Controller Amplifier CI1–8 (FIG. 8(. Selection of one of the Disc Units No. 0 to No. 3 and Disc File 0 or 1 thereof is provided by selective coupling of these control information characters to the Disc Units No. 0 to No. 3 during the time periods of the five load control pulses JC2 (FIG. 10). These pulses JC2 are timed to gate sequential ones of respective control information characters U, F, S, A, N (FIG. 9) and are transmitted on separate outputs of the Timing Pulse Counter TPC to the Disc Unit No. 0 to No. 3. The pulses JC2* are coupled to Disc Units No. 0 to No. 3 on a separate line to be gated back from any selected Disc Unit No. 0, for example, by the outputs $USL_1$, $FL_1'$(FIG. 7a) to provide answer-back pulses at output UABO* (signal, FIG. 10). These answer-back signals are coupled to Holdover Circuit CIH to provide a high level output CiH which causes Controller Address Decoder CIL to maintain a high level output CiL (signal, FIG. 10) when Controller 12 is selected during timing signal JC1 and until reset of timing signal JC3. Whenever the Unit Function Latch FL1 is set because the Disc Unit No. 0, for example, is busy, the pulses JC2* will not be gated to provide answer-back signals at output UABO* and the attempted selection of Disc Unit No. 0 will be discontinued in the absence of unit answer-back signals to the Holdover Circuit CIH (FIG. 8).

The remaining function of the Disc Controller 12 is to provide priority control for data transfer from the Disc Units No. 0 to No. 3. The priority control is necessary to select the first of the Disc Units No. 0 to No. 3 which locates the addressed data track and sector since concurrent selection of Disc Units No. 0 to No. 3 is provided, i.e., the location or seeking of the selected track and sector occurs concurrently as a result of capability of supplying control information to any or all of the Disc Units No. 0 to No. 3 independent of data transfer or, before any one of these Disc Units has located the addressed data track and sector. The Disc Units No. 0 to No. 3, as described supra, produce a pulse on outputs SeC0–3* of respective Address Compared circuits SEC, e.g., Address Compared circuit SEC (FIG. 7a), when the addressed storage location (data track and sector) is located and the Disc Unit is ready to operate to read or write data. This pulse at output SeCO*, for example, is coupled to the respective set input of Unit Priority Control UPC to produce a high level output UhC* on the respective one of the output lines UhC* as shown in FIG. 8. The first pulse applied to the set inputs of Unit Priority Control from outputs SeC0–3* will produce high level signal on the respective output UhC* and will block signals applied to the other set inputs until the Unit Priority Control UPC is reset by end-of-function reset signal applied to the reset input from the respective one of the output EFR0–3* of the Disc Units No. 0 to No. 3. The reset signal from outputs EFR0–3* indicate the completion of read or write function of the respective Disc Units No. 0 to No. 3 which has been described earlier in the description of exemplary operation of Disc Unit NO. 0 (FIG. 7*a*). The additional function of Unit Priority Control UPC is to transmit from output ID the identification number of the selected Disc Unit, File and also Controller to the Processor. The identification number is preset when priority is assigned and the selection of the proper identification number is provided by a high level signal on one of the outputs UhC*.

In the light of the above teachings, various modifications and variations of the present invention are contemplated and will be apparent to those skilled in the art without departing from the spirit and scope of the invention.

What is claimed is:

1. A disc random access data storage system including a disc file having at least one record disc mounted for rotation with storage of data along a plurality of annular record tracks on a plurality of disc surfaces, and a transducing means for selectively accessing said record tracks for reading or writing data, comprising:

a multiple head assembly comprised of sets of heat assemblies, each of which includes a plurality of transducing heads mounted for radial movement over said disc surfaces, said transducing heads providing immediately direct access to a plurality of record tracks and additionally rapid access, after repositioning, to a multiple number of other record tracks;

positioning means coupled to said head assembly including means for producing radial movement to cause said transducing heads to traverse said record tracks, said positioning means being operative only when the desired record track is not positioned for access by a transducing head;

means for indicating the position of said transducing heads relative to individual ones of said record tracks during traversal thereof;

control circuit means having an input coupled to said transducing heads and an output coupled to said positioning means for selectively supplying control signals to said positioning means during radial movement in accordance with said indication of relative position, and including comparison circuit means for recognizing the identity of an externally supplied binary coded address with a binary coded address derived from a single track of a sub-group of said annular record tracks, said sub-group of tracks being designated as label tracks, each of said label tracks having permanent data bits of an individually predetermined binary address code referencing it to a specific zone, a specific cylinder in said zone, and a specific sector, of data record tracks in the disc file.

2. The invention in accordance with claim 1 in which each of said record tracks include recorded address signals for identifying itself to the control circuit means through the transducing means; and, said control circuit means selectively supplies control signals for discontinuing radial movement of said positioning means upon receipt of the address signals of a desired data track which have been identified as equal to the address requested by the data processing unit.

3. The invention in accordance with claim 1 wherein each head assembly of said multiple head assembly positioned by said positioning means, includes a plurality of transducing heads, and at least one of said plurality of transducing heads constitutes a label head which is used to positionally locate the remainder of the transducing heads which serve as data heads; and said disc file includes a plurality of discs having a head assembly for each surface thereof wherein the label head used for positioning the group of data heads is so connected that the label head used is operated from a head assembly cooperating with a disc surface which is different from the head assembly bearing the data heads which are to be used for reading and writing data.

4. The invention in accordance with claim 3 wherein the recorded information tracks cooperating with the label heads have a width which is at least twice as wide as the width of the label head.

5. The invention in accordance with claim 3 wherein the recorded label track is comprised of a plurality of sectors wherein each of said sectors includes its own sector, zone, and cylinder addresses providing for rapid access to address information regardless of the peripheral location of the label head around the recorded label track.

6. The invention in accordance with claim 1 wherein the said transducing means for selectively accessing record tracks is responsive to said means for producing an indication of relative position, said position indication means including means for producing a position signal to said control circuit means during traversal by said transducing means of any record track prior to the positioning of said transducing means over the center of a desired individual record track.

7. The invention in accordance with claim 1 wherein the transducing means is positionably controlled by said positioning means, said positioning means including means responsive to said control signals for discontinuing radial movement of said transducing means to position a transducing head over the desired record track for reading or writing data through said transducing head;

said transducing means including label heads for reading label tracks and data heads for reading out or writing in data information tracks;

the recorded data on said label tracks being displaced with respect to the data on said data tracks by an amount corresponding to the displacement between the read-head gap of said label head and the write-head gap of the selected data head.

8. In a control system for enabling a data processor to access a selected magnetic disc annular record track from a plurality of tracks in a plurality of magnetic disc files, the apparatus comprising:

a plurality of magnetic disc files each having a plurality of disc surfaces including a plurality of annular record tracks on each surface;

a multiple head assembly comprising a plurality of multiple head units to establish at least one multiple head unit for each disc surface, said multiple head unit comprised of transducing heads forming a label head and plurality of data heads for cooperation with label tracks and data tracks on respective ones of said disc surfaces;

positioning means for each of said multiple head assemblies of each of said disc files for positioning said transducing heads to access selected record tracks without regard to the other independent search activities of the transducing and positioning means of the other disc files; control means connecting a data processing unit to said plurality of disc files, said control means being responsive to a binary coded address for accessing data tracks of a particular disc file by initiating positioning movements of said positioning means for accessing selected record tracks in the selected disc file by use of movable transducing means;

said control means permitting simultaneous scanning by said positioning means and said transducing means of a plurality of record tracks on said plurality of disc surfaces of said disc files for comparison of address codes permanently established and located on label tracks on at least one disc surface of a disc file;

and, said control means being responsive to the first transducing means of a disc file which senses the required address of a record track on a disc surface so as to make operative the said transducing means for reading out or writing in data on the desired record track;

and simultaneously providing for the action of reading or writing on a selected disc record track while positioning means of other disc files are working toward searching and locating other address storage areas which can then become operative for reading and writing upon completion of the reading and writing upon the first sensed track.

9. The system according to claim 8 including disc units comprising a plurality of disc files with rotatable mounting means and disc file unit circuit means, and wherein each of said disc files includes a movable multiple head assembly and rotatable mounting means, and said unit circuit means includes selective circuit means for selecting one of a plurality of said disc files in response to control information from said control means, and file circuit means individual to each of said disc files for positioning the movable head assembly of the respective file upon selection by said selective circuit means.

10. A disc random access memory system according to claim 9 in which said unit circuit means includes decoding circuit means responsive to an address in said control information for selectively gating said control information to actuate said file circuit means individual to the selected one of the disc files of said disc file unit in order to produce movement of the respective head assembly therefor for selectively recording and reproducing data on a selected surface of a disc in one of the disc files of said disc units.

11. The system in accordance with claim 8 in which said record tracks include recorded address signals including signals identifying the individual record tracks; and said control means selectively supplies control signals for discontinuing radial movement of said positioning means upon receipt of address signals of a desired data track.

12. The system in accordance with claim 8 in which said transducing heads and said control means produce a position identification signal prior to the positioning of a transducing head over the center of a desired individual record track.

13. The system according to claim 8 in which each of said disc surfaces includes a plurality of recorded label tracks, one label track for each position of the respective multiple head assembly, and said label tracks include different addresses for indicating the position of said multiple head assembly whereby the desired one of the plurality of record tracks individual to each of said transducing heads can be selectively accessed by reading the addresses on said label tracks.

* * * * *